United States Patent
Qian et al.

(10) Patent No.: US 12,389,127 B2
(45) Date of Patent: Aug. 12, 2025

(54) ELECTRONIC DEVICE AND METHOD FOR DYNAMICALLY ADJUSTING EXPOSURE PARAMETER OF SPECTRAL SENSOR

(71) Applicant: Honor Device Co., Ltd., Shenzhen (CN)

(72) Inventors: YanLin Qian, Shenzhen (CN); Meng Jin, Shenzhen (CN); Congchao Zhu, Shenzhen (CN); Bin Deng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 47 days.

(21) Appl. No.: 18/262,101

(22) PCT Filed: Apr. 1, 2022

(86) PCT No.: PCT/CN2022/084926
§ 371 (c)(1),
(2) Date: Jul. 19, 2023

(87) PCT Pub. No.: WO2022/267612
PCT Pub. Date: Dec. 29, 2022

(65) Prior Publication Data
US 2024/0080568 A1     Mar. 7, 2024

(30) Foreign Application Priority Data
Jun. 26, 2021   (CN) .......................... 202110715278.7

(51) Int. Cl.
*H04N 23/73*     (2023.01)
*H04N 23/63*     (2023.01)
*H04N 23/88*     (2023.01)

(52) U.S. Cl.
CPC ........... *H04N 23/73* (2023.01); *H04N 23/632* (2023.01); *H04N 23/634* (2023.01); *H04N 23/88* (2023.01)

(58) Field of Classification Search
CPC ...... H04N 23/633; H04N 23/72; H04N 23/73; H04N 23/88; H04N 25/133
(Continued)

(56) References Cited

U.S. PATENT DOCUMENTS 9,467,632 B1 * 10/2016 Chen ...................... H04N 23/73
10,708,991 B2   7/2020 Aleix et al.
(Continued)

FOREIGN PATENT DOCUMENTS

CN          1547076 A     11/2004
CN        102291538 A     12/2011
(Continued)

OTHER PUBLICATIONS

"Spectral Sensor Calibration Methods AS7341 EVK Evaluation Kit", ams application note, AN000633, v2-00, May 20, 2021, 32 pages.
(Continued)

*Primary Examiner* — Anthony J Daniels
(74) *Attorney, Agent, or Firm* — Conley Rose, P.C.

(57) ABSTRACT

An electronic device and a method for dynamically adjusting an exposure parameter of a spectral sensor. The method includes: The electronic device determines whether a Clear value is less than or equal to a first threshold; and if the Clear value is less than or equal to the first threshold, the electronic device determines whether an analog gain of the spectral sensor reaches a second threshold; and if the analog gain of the spectral sensor reaches the second threshold, the electronic device extends an exposure time of the spectral sensor; or if the analog gain of the spectral sensor does not
(Continued)

reach the second threshold, the electronic device increases the analog gain of the spectral sensor.

20 Claims, 15 Drawing Sheets

(58) Field of Classification Search
USPC ...................................................... 348/221.1
See application file for complete search history.

(56) References Cited

U.S. PATENT DOCUMENTS

| | | |
|---|---|---|
| 11,863,879 B2 | 1/2024 | Siess et al. |
| 2010/0148083 A1 | 6/2010 | Brown et al. |
| 2012/0327294 A1 | 12/2012 | Jaffrain et al. |
| 2016/0182821 A1* | 6/2016 | Shabtay ............... H04N 5/2628 348/239 |
| 2021/0318244 A1 | 10/2021 | Tatsuta |
| 2022/0412798 A1 | 12/2022 | Siess et al. |

FOREIGN PATENT DOCUMENTS

| | | |
|---|---|---|
| CN | 104270575 A | 1/2015 |
| CN | 104754240 A | 7/2015 |
| CN | 106768323 A | 5/2017 |
| CN | 109561260 A | 4/2019 |
| CN | 110476481 A | 11/2019 |
| CN | 112585450 A | 3/2021 |
| WO | 2021037934 A1 | 3/2021 |
| WO | 2021105398 A1 | 6/2021 |

OTHER PUBLICATIONS

"AS7341 11-Channel Multi-Spectral Digital Sensor", ams datasheet, DS000504, Jun. 25, 2020, 69 pages.

* cited by examiner

ELECTRONIC DEVICE AND METHOD FOR DYNAMICALLY ADJUSTING EXPOSURE PARAMETER OF SPECTRAL SENSOR

CROSS-REFERENCE TO RELATED APPLICATIONS

This application is a U.S. National Stage of International Application No. PCT/CN2022/084926 filed on Apr. 1, 2022, which claims priority to Chinese Patent Application No. 202110715278.7, filed with the China National Intellectual Property Administration on Jun. 26, 2021, both of which incorporated herein by reference in their entireties.

TECHNICAL FIELD

This application relates to the field of image processing, and particularly, to an electronic device and a method for dynamically adjusting an exposure parameter of a spectral sensor.

BACKGROUND

When a user performs photographing by using an electronic device such as a digital camera or a mobile phone, a spectral sensor disposed in a camera captures spectral data of a photographing environment and sends the spectral data to a processor for calculation, to obtain information such as a correlated color temperature, brightness, a color, and spectral data that are of a light source for photographing an image, and the electronic device adjusts white balance of the image based on the information.

However, in a case that a photographing environment is a dark light environment such as a night, because light at night is insufficient, when the user performs photographing at night, a spectral sensor designed based on narrow-band filtering often cannot implement enough exposure, and consequently information such as a correlated color temperature calculated by the processor based on spectral data of the photographing environment is inaccurate. Therefore, directly using a color temperature provided by the spectral sensor to achieve white balance in a night scene may lead to a serious color cast problem of an image, that is, a white balance processing effect achieved by the electronic device on the image is poor. How to adjust an exposure parameter of the spectral sensor in different photographing environments to resolve a color cast problem of a photographed image, is a problem increasingly concerned by a technician.

SUMMARY

An embodiment of this application provides a method for dynamically adjusting an exposure parameter of a spectral sensor, to resolve a problem that accuracy of spectral data output by the spectral sensor is not high, and a white balance adjustment effect of an image is further affected.

According to a first aspect, an embodiment of this application provides a method for dynamically adjusting an exposure parameter of a spectral sensor, including: determining whether a Clear value is less than or equal to a first threshold; and if the Clear value is less than or equal to the first threshold, determining whether an analog gain of the spectral sensor reaches a second threshold, where the second threshold is an upper threshold of the analog gain of the spectral sensor, and if the analog gain of the spectral sensor reaches the second threshold, extending an exposure time of the spectral sensor; or if the analog gain of the spectral sensor does not reach the second threshold, increasing the analog gain of the spectral sensor; or if the Clear value is greater than the first threshold, determining whether an exposure time of the spectral sensor reaches a fourth threshold, where the fourth threshold is a lower threshold of the exposure time of the spectral sensor; and if the exposure time of the spectral sensor reaches the fourth threshold, reducing an analog gain of the spectral sensor; or if the exposure time of the spectral sensor does not reach the fourth threshold, shortening the exposure time of the spectral sensor; where the exposure time of the spectral sensor and the analog gain of the spectral sensor are exposure parameters of the spectral sensor.

In the foregoing embodiment, an electronic device uses the first threshold as a critical point, to classify a photographing environment into a strong light environment (whose Clear value is greater than the first threshold) and a dark light environment (whose Clear value is less than or equal to the first threshold). The exposure parameters (the exposure time and the analog gain) of the spectral sensor are dynamically adjusted based on a type of a photographing environment and a corresponding adjustment scheme, so that spectral data output by the spectral sensor is more accurate, thereby making a CCT calculated based on the spectral data more accurate, and making a white balance effect of an image better.

With reference to the first aspect, in an implementation, the extending an exposure time of the spectral sensor specifically includes: calculating a first exposure time of the spectral sensor according to a formula $Exop\_1'=Expo*X$, where Expo is a current exposure time of the spectral sensor, Exop' is the first exposure time, and X is a first gain coefficient greater than 1; determining whether the first exposure time is greater than a third threshold, where the third threshold is an upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

In the foregoing embodiment, appropriately extending the exposure time of the spectral sensor in a weak light environment helps increase an amount of admitted light of the spectral sensor, so that the spectral sensor outputs abundant spectral data (to avoid a specific case of spectral data missing), thereby ensuring accuracy of a CCT that is of an image light source and that is calculated based on the spectral data.

With reference to the first aspect, in an implementation, the increasing the analog gain of the spectral sensor specifically includes: calculating a first analog gain of the spectral sensor according to a formula $Gain\_1'=Gain*Y$, where Gain is a current analog gain of the spectral sensor, Gain_1' is the first analog gain, and Y is a second gain coefficient greater than 1; determining whether the first analog gain is greater than the second threshold; and if the first analog gain is greater than the second threshold, setting the analog gain of the spectral sensor to the second threshold; or if the first analog gain is not greater than the second threshold, setting the analog gain of the spectral sensor to the first analog gain.

In the foregoing embodiment, appropriately increasing the analog gain of the spectral sensor in a weak light environment helps amplify, to a proper value range, the spectral data output by the spectral sensor, and increase a signal-to-noise ratio of the spectral data, thereby improving accuracy of a CCT calculated based on the spectral data.

With reference to the first aspect, in an implementation, the reducing an analog gain of the spectral sensor specifically includes: calculating a second analog gain of the spectral sensor according to a formula Gain_2' Gain*Y', where Gain is a current analog gain of the spectral sensor, Gain_2' is the second analog gain, and Y' is a fourth gain coefficient less than 1; determining whether the second analog gain is less than a fifth threshold, where the fifth threshold is a lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

In the foregoing embodiment, appropriately reducing the analog gain of the spectral sensor in a strong light environment helps amplify, to a proper value range, the spectral data output by the spectral sensor, and increase a signal-to-noise ratio of the spectral data, thereby improving accuracy of a CCT calculated based on the spectral data.

With reference to the first aspect, in an implementation, the shortening the exposure time of the spectral sensor specifically includes: calculating a second exposure time of the spectral sensor according to a formula Exop_2'=Expo*X', where Expo is a current exposure time of the spectral sensor, X' is a third gain coefficient less than 1, and Exop_2' is the second exposure time; determining whether the second exposure time is less than the fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

In the foregoing embodiment, appropriately shortening the exposure time of the spectral sensor in a strong light environment helps properly increase an amount of admitted light of the spectral sensor, to prevent the following: an amount of admitted light of the spectral sensor is excessive and exceeds a maximum amplitude of an optical channel response of the spectral sensor, making the spectral data output by the spectral sensor abnormal and consequently affecting accuracy of a CCT that is of an image light source and that is calculated based on the spectral data.

According to a second aspect, an embodiment of this application provides a method for dynamically adjusting an exposure parameter of a spectral sensor, including: determining whether a Clear value is less than or equal to a first threshold; and if the Clear value is less than or equal to the first threshold, determining whether an exposure time of the spectral sensor reaches a third threshold, where the third threshold is an upper threshold of the exposure time of the spectral sensor; and if the exposure time of the spectral sensor reaches the third threshold, increasing an analog gain of the spectral sensor; or if the exposure time of the spectral sensor does not reach the third threshold, extending the exposure time of the spectral sensor; or if the Clear value is greater than the first threshold, determining whether an analog gain of the spectral sensor reaches a fifth threshold, where the fifth threshold is a lower threshold of the analog gain; and if the analog gain of the spectral sensor reaches the fifth threshold, shortening an exposure time of the spectral sensor; or if the analog gain of the spectral sensor does not reach the fifth threshold, reducing the analog gain of the spectral sensor; where the exposure time of the spectral sensor and the analog gain of the spectral sensor are exposure parameters of the spectral sensor.

In the foregoing embodiment, an electronic device uses the first threshold as a critical point, to classify a photographing environment into a strong light environment (whose Clear value is greater than the first threshold) and a dark light environment (whose Clear value is less than or equal to the first threshold). The exposure parameters (the exposure time and the analog gain) of the spectral sensor are dynamically adjusted based on a type of a photographing environment and a corresponding adjustment scheme, so that spectral data output by the spectral sensor is more accurate, thereby making a CCT calculated based on the spectral data more accurate, and making a white balance effect of an image better.

With reference to the second aspect, in an implementation, the extending the exposure time of the spectral sensor specifically includes: calculating a first exposure time of the spectral sensor according to a formula Exop_1'=Expo*X, where Expo is a current exposure time of the spectral sensor, Exop' is the first exposure time, and X is a first gain coefficient greater than 1; determining whether the first exposure time is greater than the third threshold, wherein the third threshold is the upper threshold of the exposure time of the spectral sensor, and if the first exposure time is greater than the third threshold, setting the exposure time of the spectral sensor to the third threshold; or if the first exposure time is not greater than the third threshold, setting the exposure time of the spectral sensor to the first exposure time.

In the foregoing embodiment, appropriately extending the exposure time of the spectral sensor in a weak light environment helps increase an amount of admitted light of the spectral sensor, so that the spectral sensor outputs abundant spectral data (to avoid a specific case of spectral data missing), thereby ensuring accuracy of a CCT that is of an image light source and that is calculated based on the spectral data.

With reference to the second aspect, in an implementation, the increasing an analog gain of the spectral sensor specifically includes: calculating a first analog gain of the spectral sensor according to a formula Gain_1' Gain*Y, where Gain is a current analog gain of the spectral sensor, Gain_1' is the first analog gain, and Y is a second gain coefficient greater than 1; determining whether the first analog gain is greater than a second threshold; and if the first analog gain is greater than the second threshold, setting the analog gain of the spectral sensor to the second threshold; or if the first analog gain is not greater than the second threshold, setting the analog gain of the spectral sensor to the first analog gain.

In the foregoing embodiment, appropriately increasing the analog gain of the spectral sensor in a weak light environment helps amplify, to a proper value range, the spectral data output by the spectral sensor, and increase a signal-to-noise ratio of the spectral data, thereby improving accuracy of a CCT calculated based on the spectral data.

With reference to the second aspect, in an implementation, the reducing the analog gain of the spectral sensor specifically includes: calculating a second analog gain of the spectral sensor according to a formula Gain_2'=_Gain*Y', where Gain is a current analog gain of the spectral sensor, Gain_2' is the second analog gain, and Y' is a fourth gain coefficient less than 1; determining whether the second analog gain is less than the fifth threshold, where the fifth threshold is the lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

In the foregoing embodiment, appropriately reducing the analog gain of the spectral sensor in a strong light environment helps amplify, to a proper value range, the spectral data output by the spectral sensor, and increase a signal-to-noise ratio of the spectral data, thereby improving accuracy of a CCT calculated based on the spectral data.

With reference to the second aspect, in an implementation, the shortening an exposure time of the spectral sensor specifically includes: calculating a second exposure time of the spectral sensor according to a formula Exop_2'=Expo*X', where Expo is a current exposure time of the spectral sensor, X' is a third gain coefficient less than 1, and Exop_2' is the second exposure time; determining whether the second exposure time is less than a fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

In the foregoing embodiment, appropriately shortening the exposure time of the spectral sensor in a strong light environment helps properly increase an amount of admitted light of the spectral sensor, to prevent the following: an amount of admitted light of the spectral sensor is excessive and exceeds a maximum amplitude of an optical channel response of the spectral sensor, making the spectral data output by the spectral sensor abnormal and consequently affecting accuracy of a CCT that is of an image light source and that is calculated based on the spectral data.

According to a third aspect, an embodiment of this application provides a method for dynamically adjusting an exposure parameter of a spectral sensor, including: determining whether a Clear value is less than or equal to a first threshold; and if the Clear value is less than or equal to the first threshold, determining whether an analog gain of the spectral sensor reaches a second threshold, where the second threshold is an upper threshold of the analog gain of the spectral sensor, and if the analog gain of the spectral sensor reaches the second threshold, extending an exposure time of the spectral sensor; or if the analog gain of the spectral sensor does not reach the second threshold, increasing the analog gain of the spectral sensor; or if the Clear value is greater than the first threshold, determining whether an analog gain of the spectral sensor reaches a fifth threshold, where the fifth threshold is a lower threshold of the analog gain of the spectral sensor; and if the analog gain of the spectral sensor reaches the fifth threshold, shortening an exposure time of the spectral sensor; or if the analog gain of the spectral sensor does not reach the fifth threshold, reducing the analog gain of the spectral sensor; where the exposure time of the spectral sensor and the analog gain of the spectral sensor are exposure parameters of the spectral sensor.

In the foregoing embodiment, an electronic device uses the first threshold as a critical point, to classify a photographing environment into a strong light environment (whose Clear value is greater than the first threshold) and a dark light environment (whose Clear value is less than or equal to the first threshold). The exposure parameters (the exposure time and the analog gain) of the spectral sensor are dynamically adjusted based on a type of a photographing environment and a corresponding adjustment scheme, so that spectral data output by the spectral sensor is more accurate, thereby making a CCT calculated based on the spectral data more accurate, and making a white balance effect of an image better.

With reference to the third aspect, in an implementation, the extending an exposure time of the spectral sensor specifically includes: calculating a first exposure time of the spectral sensor according to a formula Exop_1'=Expo*X, where Expo is a current exposure time of the spectral sensor, Exop' is the first exposure time, and X is a first gain coefficient greater than 1; determining whether the first exposure time is greater than a third threshold, where the third threshold is an upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

In the foregoing embodiment, appropriately extending the exposure time of the spectral sensor in a weak light environment helps increase an amount of admitted light of the spectral sensor, so that the spectral sensor outputs abundant spectral data (to avoid a specific case of spectral data missing), thereby ensuring accuracy of a CCT that is of an image light source and that is calculated based on the spectral data.

With reference to the third aspect, the increasing the analog gain of the spectral sensor specifically includes: calculating a first analog gain of the spectral sensor according to a formula Gain_1'=Gain*Y, where Gain is a current analog gain of the spectral sensor, Gain_1' is the first analog gain, and Y is a second gain coefficient greater than 1; determining whether the first analog gain is greater than the second threshold; and if the first analog gain is greater than the second threshold, setting the analog gain of the spectral sensor to the second threshold; or if the first analog gain is not greater than the second threshold, setting the analog gain of the spectral sensor to the first analog gain.

In the foregoing embodiment, appropriately increasing the analog gain of the spectral sensor in a weak light environment helps amplify, to a proper value range, the spectral data output by the spectral sensor, and increase a signal-to-noise ratio of the spectral data, thereby improving accuracy of a CCT calculated based on the spectral data.

With reference to the third aspect, in an implementation, the reducing the analog gain of the spectral sensor specifically includes: calculating a second analog gain of the spectral sensor according to a formula Gain_2'=_Gain*Y', where Gain is a current analog gain of the spectral sensor, Gain_2' is the second analog gain, and Y' is a fourth gain coefficient less than 1; determining whether the second analog gain is less than the fifth threshold, where the fifth threshold is the lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

In the foregoing embodiment, appropriately reducing the analog gain of the spectral sensor in a strong light environment helps amplify, to a proper value range, the spectral data output by the spectral sensor, and increase a signal-to-noise ratio of the spectral data, thereby improving accuracy of a CCT calculated based on the spectral data.

With reference to the third aspect, in an implementation, the shortening an exposure time of the spectral sensor specifically includes: calculating a second exposure time of the spectral sensor according to a formula $Exop\_2'=Expo*X'$, where Expo is a current exposure time of the spectral sensor, X' is a third gain coefficient less than 1, and $Exop\_2'$ is the second exposure time; determining whether the second exposure time is less than a fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

In the foregoing embodiment, appropriately shortening the exposure time of the spectral sensor in a strong light environment helps properly increase an amount of admitted light of the spectral sensor, to prevent the following: an amount of admitted light of the spectral sensor is excessive and exceeds a maximum amplitude of an optical channel response of the spectral sensor, making the spectral data output by the spectral sensor abnormal and consequently affecting accuracy of a CCT that is of an image light source and that is calculated based on the spectral data.

According to a fourth aspect, an embodiment of this application provides a method for dynamically adjusting an exposure parameter of a spectral sensor, including: determining whether a Clear value is less than or equal to a first threshold; and if the Clear value is less than or equal to the first threshold, determining whether an exposure time of the spectral sensor reaches a third threshold, where the third threshold is an upper threshold of the exposure time of the spectral sensor; and if the exposure time of the spectral sensor reaches the third threshold, increasing an analog gain of the spectral sensor; or if the exposure time of the spectral sensor does not reach the third threshold, extending the exposure time of the spectral sensor; or if the Clear value is greater than the first threshold, determining whether the exposure time of the spectral sensor reaches a fourth threshold, where the fourth threshold is a lower threshold of the exposure time of the spectral sensor; and if the exposure time of the spectral sensor reaches the fourth threshold, reducing an analog gain of the spectral sensor; or if the exposure time of the spectral sensor does not reach the fourth threshold, shortening the exposure time of the spectral sensor; where the exposure time of the spectral sensor and the analog gain of the spectral sensor are exposure parameters of the spectral sensor.

In the foregoing embodiment, an electronic device uses the first threshold as a critical point, to classify a photographing environment into a strong light environment (whose Clear value is greater than the first threshold) and a dark light environment (whose Clear value is less than or equal to the first threshold). The exposure parameters (the exposure time and the analog gain) of the spectral sensor are dynamically adjusted based on a type of a photographing environment and a corresponding adjustment scheme, so that spectral data output by the spectral sensor is more accurate, thereby making a CCT calculated based on the spectral data more accurate, and making a white balance effect of an image better.

With reference to the fourth aspect, in an implementation, the extending the exposure time of the spectral sensor specifically includes: calculating a first exposure time of the spectral sensor according to a formula $Exop\_1'=Expo*X$, where Expo is a current exposure time of the spectral sensor, $Exop'$ is the first exposure time, and X is a first gain coefficient greater than 1; determining whether the first exposure time is greater than the third threshold, where the third threshold is the upper threshold of the exposure time of the spectral sensor, and if the first exposure time is greater than the third threshold, setting the exposure time of the spectral sensor to the third threshold; or if the first exposure time is not greater than the third threshold, setting the exposure time of the spectral sensor to the first exposure time.

In the foregoing embodiment, appropriately extending the exposure time of the spectral sensor in a weak light environment helps increase an amount of admitted light of the spectral sensor, so that the spectral sensor outputs abundant spectral data (to avoid a specific case of spectral data missing), thereby ensuring accuracy of a CCT that is of an image light source and that is calculated based on the spectral data.

With reference to the fourth aspect, in an implementation, the increasing an analog gain of the spectral sensor specifically includes: calculating a first analog gain of the spectral sensor according to a formula $Gain\_'=Gain*Y$, where Gain is a current analog gain of the spectral sensor, $Gain\_1'$ is the first analog gain, and Y is a second gain coefficient greater than 1; determining whether the first analog gain is greater than a second threshold; and if the first analog gain is greater than the second threshold, setting the analog gain of the spectral sensor to the second threshold; or if the first analog gain is not greater than the second threshold, setting the analog gain of the spectral sensor to the first analog gain.

In the foregoing embodiment, appropriately increasing the analog gain of the spectral sensor in a weak light environment helps amplify, to a proper value range, the spectral data output by the spectral sensor, and increase a signal-to-noise ratio of the spectral data, thereby improving accuracy of a CCT calculated based on the spectral data.

With reference to the fourth aspect, in an implementation, the reducing an analog gain of the spectral sensor specifically includes: calculating a second analog gain of the spectral sensor according to a formula $Gain\_2'\ Gain*Y'$, where Gain is a current analog gain of the spectral sensor, $Gain\_2'$ is the second analog gain, and Y' is a fourth gain coefficient less than 1; determining whether the second analog gain is less than a fifth threshold, where the fifth threshold is a lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

In the foregoing embodiment, appropriately reducing the analog gain of the spectral sensor in a strong light environment helps amplify, to a proper value range, the spectral data output by the spectral sensor, and increase a signal-to-noise ratio of the spectral data, thereby improving accuracy of a CCT calculated based on the spectral data.

With reference to the fourth aspect, in an implementation, the shortening the exposure time of the spectral sensor specifically includes: calculating a second exposure time of the spectral sensor according to a formula $Exop\_2'=Expo*X'$, where Expo is a current exposure time of the spectral sensor, X' is a third gain coefficient less than 1, and $Exop\_2'$ is the second exposure time; determining whether the second exposure time is less than the fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

In the foregoing embodiment, appropriately shortening the exposure time of the spectral sensor in a strong light environment helps properly increase an amount of admitted light of the spectral sensor, to prevent the following: an amount of admitted light of the spectral sensor is excessive and exceeds a maximum amplitude of an optical channel response of the spectral sensor, making the spectral data output by the spectral sensor abnormal and consequently affecting accuracy of a CCT that is of an image light source and that is calculated based on the spectral data.

According to a fifth aspect, an embodiment of this application provides an electronic device, where the electronic device includes one or more processors and a memory. The memory is coupled to the one or more processors. The memory is configured to store computer program code, and the computer program code includes computer instructions. The one or more processors invoke the computer instructions to enable the electronic device to perform the following: determining whether a Clear value is less than or equal to a first threshold; and if the Clear value is less than or equal to the first threshold, determining whether an analog gain of the spectral sensor reaches a second threshold, where the second threshold is an upper threshold of the analog gain of the spectral sensor; and if the analog gain of the spectral sensor reaches the second threshold, extending an exposure time of the spectral sensor; or if the analog gain of the spectral sensor does not reach the second threshold, increasing the analog gain of the spectral sensor; or if the Clear value is greater than the first threshold, determining whether an exposure time of the spectral sensor reaches a fourth threshold, where the fourth threshold is a lower threshold of the exposure time of the spectral sensor; and if the exposure time of the spectral sensor reaches the fourth threshold, reducing an analog gain of the spectral sensor; or if the exposure time of the spectral sensor does not reach the fourth threshold, shortening the exposure time of the spectral sensor; where the exposure time of the spectral sensor and the analog gain of the spectral sensor are exposure parameters of the spectral sensor.

With reference to the fifth aspect, in an implementation, the one or more processors are further configured to invoke the computer instructions to enable the electronic device to perform the following: calculating a first exposure time of the spectral sensor according to a formula $Exop\_1'=Expo*X$, where Expo is a current exposure time of the spectral sensor, Exop' is the first exposure time, and X is a first gain coefficient greater than 1; determining whether the first exposure time is greater than a third threshold, where the third threshold is an upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

With reference to the fifth aspect, in an implementation, the one or more processors are further configured to invoke the computer instructions to enable the electronic device to perform the following: calculating a first analog gain of the spectral sensor according to a formula $Gain\_1'=Gain*Y$, where Gain is a current analog gain of the spectral sensor, Gain_1' is the first analog gain, and Y is a second gain coefficient greater than 1; determining whether the first analog gain is greater than the second threshold; and if the first analog gain is greater than the second threshold, setting the analog gain of the spectral sensor to the second threshold; or if the first analog gain is not greater than the second threshold, setting the analog gain of the spectral sensor to the first analog gain.

With reference to the fifth aspect, in an implementation, the one or more processors are further configured to invoke the computer instructions to enable the electronic device to perform the following: calculating a second analog gain of the spectral sensor according to a formula $Gain\_2'=Gain*Y'$, where Gain is a current analog gain of the spectral sensor, Gain_2' is the second analog gain, and Y' is a fourth gain coefficient less than 1; determining whether the second analog gain is less than a fifth threshold, where the fifth threshold is a lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

With reference to the fifth aspect, in an implementation, the one or more processors are further configured to invoke the computer instructions to enable the electronic device to perform the following: calculating a second exposure time of the spectral sensor according to a formula $Exop\_2'=Expo*X'$, where Expo is a current exposure time of the spectral sensor, X' is a third gain coefficient less than 1, and Exop_2' is the second exposure time; determining whether the second exposure time is less than the fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

With reference to the fifth aspect, in an implementation, the one or more processors are further configured to invoke the computer instructions to enable the electronic device to perform the following: determining whether a Clear value is less than or equal to a first threshold; and if the Clear value is less than or equal to the first threshold, determining whether an exposure time of the spectral sensor reaches a third threshold, where the third threshold is an upper threshold of the exposure time of the spectral sensor; and if the exposure time of the spectral sensor reaches the third threshold, increasing an analog gain of the spectral sensor; or if the exposure time of the spectral sensor does not reach the third threshold, extending the exposure time of the spectral sensor; or if the Clear value is greater than the first threshold, determining whether an analog gain of the spectral sensor reaches a fifth threshold, where the fifth threshold is a lower threshold of the analog gain; and if the analog gain of the spectral sensor reaches the fifth threshold, shortening an exposure time of the spectral sensor; or if the analog gain of the spectral sensor does not reach the fifth threshold, reducing the analog gain of the spectral sensor; where the exposure time of the spectral sensor and the analog gain of the spectral sensor are exposure parameters of the spectral sensor.

With reference to the fifth aspect, in an implementation, the one or more processors are further configured to invoke the computer instructions to enable the electronic device to perform the following: calculating a first exposure time of the spectral sensor according to a formula $Exop\_1'=Expo*X$, where Ex) is a current exposure time of the spectral sensor, Exop' is the first exposure time, and X is a first gain coefficient greater than 1; determining whether the first exposure time is greater than the third threshold, where the third threshold is the upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

With reference to the fifth aspect, in an implementation, the one or more processors are further configured to invoke the computer instructions to enable the electronic device to perform the following: calculating a first analog gain of the spectral sensor according to a formula Gain_1'=Gain*Y, where Gain is a current analog gain of the spectral sensor, Gain_1' is the first analog gain, and Y is a second gain coefficient greater than 1; determining whether the first analog gain is greater than a second threshold; and if the first analog gain is greater than the second threshold, setting the analog gain of the spectral sensor to the second threshold; or if the first analog gain is not greater than the second threshold, setting the analog gain of the spectral sensor to the first analog gain.

With reference to the fifth aspect, in an implementation, the one or more processors are further configured to invoke the computer instructions to enable the electronic device to perform the following: calculating a second analog gain of the spectral sensor according to a formula Gain_2'=Gain*Y', where Gain is a current analog gain of the spectral sensor, Gain_2' is the second analog gain, and Y' is a fourth gain coefficient less than 1; determining whether the second analog gain is less than the fifth threshold, where the fifth threshold is the lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

With reference to the fifth aspect, in an implementation, the one or more processors are further configured to invoke the computer instructions to enable the electronic device to perform the following: calculating a second exposure time of the spectral sensor according to a formula Exop_2'=Expo*X', where Expo is a current exposure time of the spectral sensor, X' is a third gain coefficient less than 1, and Exop_2' is the second exposure time; determining whether the second exposure time is less than a fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

With reference to the fifth aspect, in an implementation, the one or more processors are further configured to invoke the computer instructions to enable the electronic device to perform the following: determining whether a Clear value is less than or equal to a first threshold; and if the Clear value is less than or equal to the first threshold, determining whether an analog gain of the spectral sensor reaches a second threshold, where the second threshold is an upper threshold of the analog gain of the spectral sensor; and if the analog gain of the spectral sensor reaches the second threshold, extending an exposure time of the spectral sensor; or if the analog gain of the spectral sensor does not reach the second threshold, increasing the analog gain of the spectral sensor; or if the Clear value is greater than the first threshold, determining whether an analog gain of the spectral sensor reaches a fifth threshold, where the fifth threshold is a lower threshold of the analog gain of the spectral sensor; and if the analog gain of the spectral sensor reaches the fifth threshold, shortening an exposure time of the spectral sensor; or if the analog gain of the spectral sensor does not reach the fifth threshold, reducing the analog gain of the spectral sensor; where the exposure time of the spectral sensor and the analog gain of the spectral sensor are exposure parameters of the spectral sensor.

With reference to the fifth aspect, in an implementation, the one or more processors are further configured to invoke the computer instructions to enable the electronic device to perform the following: calculating a first exposure time of the spectral sensor according to a formula Exop_1'=Expo*X, where Ex) is a current exposure time of the spectral sensor, Exop' is the first exposure time, and X is a first gain coefficient greater than 1; determining whether the first exposure time is greater than a third threshold, where the third threshold is an upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

With reference to the fifth aspect, in an implementation, the one or more processors are further configured to invoke the computer instructions to enable the electronic device to perform the following: calculating a first analog gain of the spectral sensor according to a formula Gain_1'=Gain*Y, where Gain is a current analog gain of the spectral sensor, Gain_1' is the first analog gain, and Y is a second gain coefficient greater than 1; determining whether the first analog gain is greater than the second threshold; and if the first analog gain is greater than the second threshold, setting the analog gain of the spectral sensor to the second threshold; or if the first analog gain is not greater than the second threshold, setting the analog gain of the spectral sensor to the first analog gain.

With reference to the fifth aspect, in an implementation, the one or more processors are further configured to invoke the computer instructions to enable the electronic device to perform the following: calculating a second analog gain of the spectral sensor according to a formula Gain_2'=Gain*Y', where Gain is a current analog gain of the spectral sensor, Gain_2' is the second analog gain, and Y' is a fourth gain coefficient less than 1; determining whether the second analog gain is less than the fifth threshold, where the fifth threshold is the lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

With reference to the fifth aspect, in an implementation, the one or more processors are further configured to invoke the computer instructions to enable the electronic device to perform the following: calculating a second exposure time of the spectral sensor according to a formula Exop_2'=Expo*X', where Expo is a current exposure time of the spectral sensor, X' is a third gain coefficient less than 1, and Exop_2' is the second exposure time; determining whether the second exposure time is less than a fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

With reference to the fifth aspect, in an implementation, the one or more processors are further configured to invoke the computer instructions to enable the electronic device to perform the following: determining whether a Clear value is less than or equal to a first threshold; and if the Clear value is less than or equal to the first threshold, determining whether an exposure time of the spectral sensor reaches a third threshold, where the third threshold is an upper threshold of the exposure time of the spectral sensor; and if the exposure time of the spectral sensor reaches the third threshold, increasing an analog gain of the spectral sensor; or if the exposure time of the spectral sensor does not reach the third threshold, extending the exposure time of the spectral sensor; or; if the Clear value is greater than the first threshold, determining whether an exposure time of the spectral sensor reaches a fourth threshold, where the fourth threshold is a lower threshold of the exposure time of the spectral sensor; and if the exposure time of the spectral sensor reaches the fourth threshold, reducing an analog gain of the spectral sensor; or if the exposure time of the spectral sensor does not reach the fourth threshold, shortening the exposure time of the spectral sensor; where the exposure time of the spectral sensor and the analog gain of the spectral sensor are exposure parameters of the spectral sensor.

With reference to the fifth aspect, in an implementation, the one or more processors are further configured to invoke the computer instructions to enable the electronic device to perform the following: calculating a first exposure time of the spectral sensor according to a formula $Exop\_1'=Expo*X$, where Expo is a current exposure time of the spectral sensor, $Exop'$ is the first exposure time, and X is a first gain coefficient greater than 1; determining whether the first exposure time is greater than the third threshold, where the third threshold is the upper threshold of the exposure time of the spectral sensor; and if the first exposure time is greater than the third threshold, setting the exposure time of the spectral sensor to the third threshold; or if the first exposure time is not greater than the third threshold, setting the exposure time of the spectral sensor to the first exposure time.

With reference to the fifth aspect, in an implementation, the one or more processors are further configured to invoke the computer instructions to enable the electronic device to perform the following: calculating a first analog gain of the spectral sensor according to a formula $Gain\_1'=Gain*Y$, where Gain is a current analog gain of the spectral sensor, $Gain\_1'$ is the first analog gain, and Y is a second gain coefficient greater than 1; determining whether the first analog gain is greater than a second threshold; and if the first analog gain is greater than the second threshold, setting the analog gain of the spectral sensor to the second threshold; or if the first analog gain is not greater than the second threshold, setting the analog gain of the spectral sensor to the first analog gain.

With reference to the fifth aspect, in an implementation, the one or more processors are further configured to invoke the computer instructions to enable the electronic device to perform the following: calculating a second analog gain of the spectral sensor according to a formula $Gain\_2'=Gain*Y'$, where Gain is a current analog gain of the spectral sensor, $Gain\_2'$ is the second analog gain, and $Y'$ is a fourth gain coefficient less than 1; determining whether the second analog gain is less than a fifth threshold, where the fifth threshold is a lower threshold of the analog gain of the spectral sensor; and if the second analog gain is less than the fifth threshold, setting the analog gain of the spectral sensor to the fifth threshold; or if the second analog gain is not less than the fifth threshold, setting the analog gain of the spectral sensor to the second analog gain.

With reference to the fifth aspect, in an implementation, the one or more processors are further configured to invoke the computer instructions to enable the electronic device to perform the following: calculating a second exposure time of the spectral sensor according to a formula $Exop\_2'=Expo*X'$, where Expo is a current exposure time of the spectral sensor, $X'$ is a third gain coefficient less than 1, and $Exop\_2'$ is the second exposure time; determining whether the second exposure time is less than the fourth threshold; and if the second exposure time is less than the fourth threshold, setting the exposure time of the spectral sensor to the fourth threshold; or if the second exposure time is not less than the fourth threshold, setting the exposure time of the spectral sensor to the second exposure time.

According to a sixth aspect, an embodiment of this application provides an electronic device, including a touchscreen, a camera, one or more processors, and one or more memories. The one or more processors are coupled to the touchscreen, the camera, and the one or more memories. The one or more memories are configured to store computer program code, and the computer program code includes computer instructions. When the one or more processors execute the computer instructions, the electronic device is enabled to perform the method according to any one of the first aspect or the implementations of the first aspect.

According to a seventh aspect, an embodiment of this application provides a chip system, where the chip system is applied to an electronic device. The chip system includes one or more processors. The one or more processors are configured to invoke computer instructions, so that the electronic device is enabled to perform the method according to any one of the first aspect or the implementations of the first aspect.

According to an eighth aspect, an embodiment of this application provides a computer program product including instructions. When the computer program product runs on an electronic device, the electronic device is enabled to perform the method according to any one of the first aspect or the implementations of the first aspect.

According to a ninth aspect, an embodiment of this application provides a computer-readable storage medium, including instructions. When the instructions are run on an electronic device, the electronic device is enabled to perform the method according to any one of the first aspect or the implementations of the first aspect.

DESCRIPTION OF EMBODIMENTS

Figure 1:
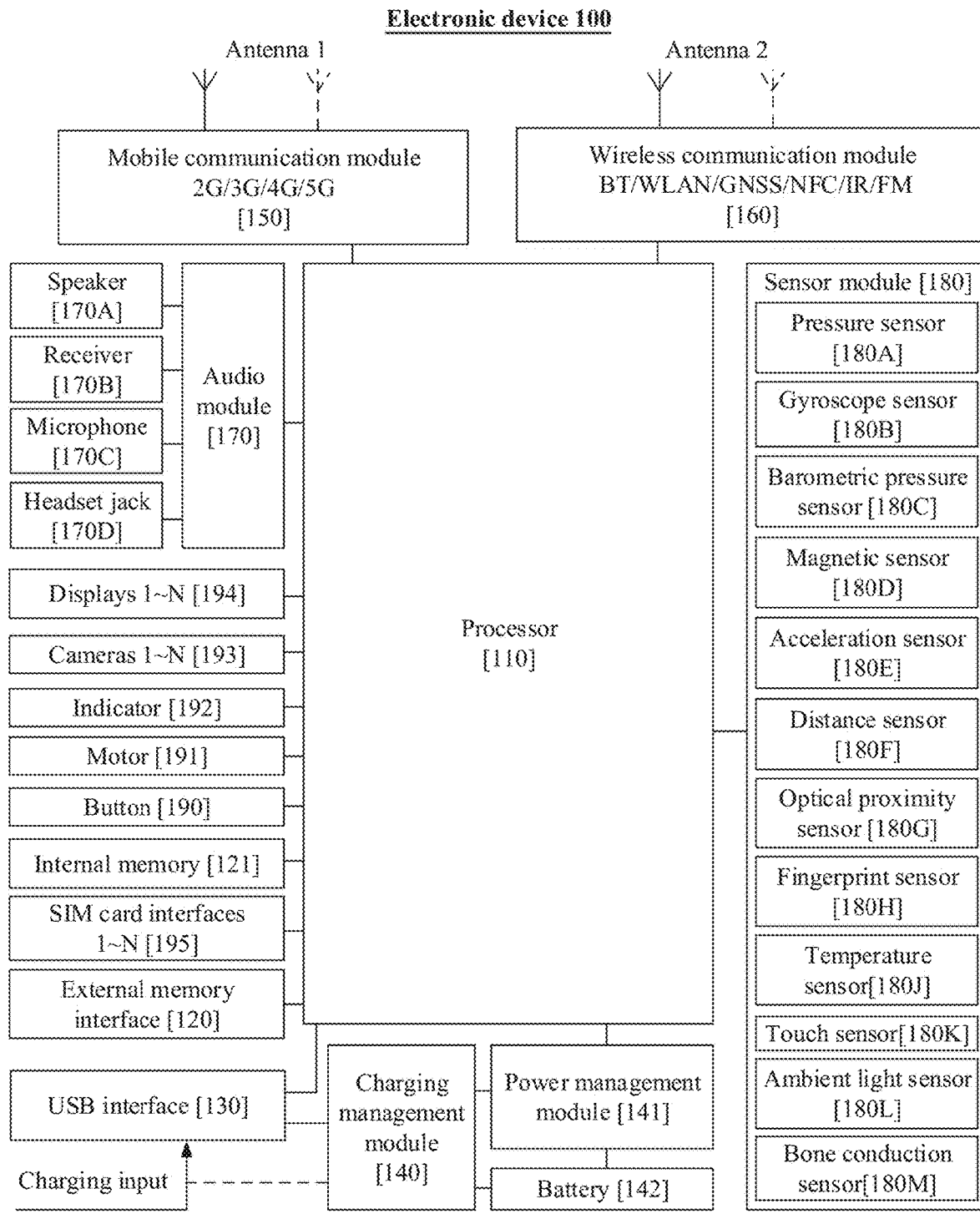
FIG. 1 is a schematic diagram of a hardware structure of an electronic device 100 according to an embodiment of this application.

The following clearly and completely describes technical solutions in embodiments of this application with reference to the accompanying drawings in the embodiments of this application. Clearly, the described embodiments are merely some rather than all of embodiments of this application. Mentioning an "embodiment" in this specification means that a specific feature, structure, or characteristic described with reference to this embodiment may be included in at least one embodiment of this application. The word appearing at different positions in this specification does not necessarily refer to a same embodiment, and is not an independent or alternate embodiment exclusive with another embodiment. A person skilled in the art may explicitly and implicitly understand that the embodiments described in this specification may be combined with another embodiment. Based on the embodiments of this application, all other embodiments obtained by a person of ordinary skill in the art without creative efforts fall within the protection scope of this application.

In the specification, claims, and accompanying drawings of this application, terms "first", "second", "third", and the like are intended to distinguish between different objects, but are not intended to describe particular sequence. In addition, terms "include" and "have", and any variants thereof, are intended to cover non-exclusive inclusion. For example, a series of steps or units are included, or optionally, steps or units not listed are further included, or optionally other steps or units inherent in these processes, methods, products, or devices are further included.

The accompanying drawings show only some content related to this application but not all content. Before discussing example embodiments in more detail, it should be mentioned that some example embodiments are described as processing or methods depicted as flowcharts. Although the flowcharts describe operations (or steps) as sequential processing, many of these operations may be implemented in parallel, concurrently, or simultaneously. In addition, a sequence of operations may be rescheduled. The processing may be terminated when its operations are completed, but additional steps not included in the accompanying drawings may be included. The processing may correspond to a method, a function, a procedure, a subroutine, a subprogram, or the like.

Terms "part", "module", "system", "unit", and the like used in this specification are used to represent computer-related entities, hardware, firmware, a combination of hardware and software, software, or software in execution. For example, the unit may be but is not limited to a process running on a processor, a processor, an object, an executable file, an execution thread, a program, and/or distributed between two or more computers. In addition, the unit may be executed by various computer-readable media on which various data structures are stored. For example, a unit may communicate through local and/or remote processes based on a signal with one or more data packets (for example, second unit data exchanged by another unit from a local system, a distributed system, and/or a network, and for example, an internet that interacts with another system by using a signal).

The technical terms used in the embodiments of this application are explained below.

(1) Spectrum (Spectrum): a pattern obtained by sequentially arranging dispersed monochromatic light based on wavelengths (or frequencies) after polychromatic light passes through and is split by a dispersion system (for example, a prism or a grating), with a full name of optical spectrum.

(2) Multispectral sensor; configured to obtain spectral data of a photographing environment. A housing of the sensor is provided with an incident aperture for receiving radiation to be measured. In a radiation path behind the incident aperture, an optical apparatus splits an incident beam, and incident beams obtained after the splitting are enabled to enter several filters. These filters have different spectral transmission ranges, and are reflective beyond these ranges. A radiation sensitive element is mounted in each of radiation paths for some of beams behind these filters.

(3) Correlated color temperature (Correlated Colour Temperature, CCT): a temperature at which a black-body radiator has a color that is closest to a color with a same brightness stimulus. The correlated color temperature is represented by a Kelvin temperature, and is used to describe a metric of a color of light near the Planckian locus. Other light sources other than a thermal radiation light source have linear spectra, and radiation characteristics of these light sources are quite different from those of black-body radiation. Therefore, light colors of these light sources may not accurately fall on a black-body locus in a chromaticity diagram. For these light sources, the CCT is usually used to describe color characteristics of the light sources.

(4) Exposure time (Exposure time): a time interval from opening to closing of a shutter. The shutter is an apparatus for controlling duration of light irradiation on a photosensitive element in a camera. A longer exposure time indicates a larger amount of admitted light, and a shorter exposure time indicates a smaller amount of admitted light.

(5) RGB: a three-dimensional vector (R, G, B). R, G, and B respectively represent amplitudes on three color channels of red (Red), green (Green), and blue (Blue).

(6) RGB_GAIN: a three-dimensional vector (GAIN_R, GAIN_G, GAIN_B). GAIN_R, GAIN_G, and GAIN_B respectively represent ratios on three color channels of red (Red), green (Green), and blue (Blue). RGB_GAIN is also referred to as an RGB gain value. After RGB_GAIN of an image light source is multiplied by RGB of the image light source, a three-dimensional vector (R*GAIN_R. G*GAIN_G, B*GAIN_B) is obtained, where R*GAIN_R=G*GAIN_G=B*GAIN_B.

The following describes a hardware structure of an electronic device 100. FIG. 1 is a schematic diagram of a hardware structure of the electronic device 100 according to an embodiment of this application.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It can be understood that an example structure in this embodiment of the present invention does not constitute a specific limitation on the electronic device 100. In some other embodiments of this application, the electronic device 100 may include more or fewer parts than those shown in the figure, some parts may be combined, some parts may be split, or different parts may be disposed. Illustrated parts may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, and complete control of instruction fetching and instruction execution.

A memory may be disposed in the processor 110, and is configured to store instructions and data. In some embodiments, the memory in the processor 110 is a cache. The memory may store instructions just used or cyclically used by the processor 110 or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving efficiency of a system.

A wireless communication function of the electronic device 100 may be implemented by using the antenna 1, the antenna 2, the mobile communication module 150, the wireless communication module 160, the modem processor, the baseband processor, and the like.

The electronic device 100 implements a display function by using the GPU, the display 194, the application processor, and the like. The GPU is a microprocessor for image processing and is connected to the display 194 and the application processor. The GPU is configured to perform mathematical and geometric calculation, and is configured to render graphics. The processor 110 may include one or more GPUs, and the one or more GPUs execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include 1 or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transmitted to the photosensitive element of the camera through a lens. An optical signal is converted into an electrical signal. The photosensitive element of the camera transmits the electrical signal to the ISP for processing, to convert the electrical signal into an image visible to naked eyes. The ISP may also perform algorithm optimization on noise of an image, brightness, and a complexion. The ISP may also optimize parameters such as exposure and a color temperature of a photographing scenario. In some embodiments, the ISP may be disposed in the camera 193.

The camera 193 is configured to capture a still image or a video. An optical image is generated by an object through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to be converted into a digital image signal. The ISP outputs the digital image signal to the DSP for processing. The DSP converts the digital image signal into an image signal in standard formats such as RGB and YUV. In some embodiments, the electronic device 100 may include 1 or N cameras 193, where N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The external memory interface 120 may be configured to connect an external storage card, for example, a Micro SD card, to expand a storage capacity of the electronic device 100. The external storage card communicates with the processor 110 through the external memory interface 120, to implement a data storage function. For example, files such as music and a video are stored in the external storage card.

The internal memory 121 may be configured to store computer-executable program code, where the executable program code includes instructions. The processor 110 performs various function applications and data processing of the electronic device 100 by running the instructions stored in the internal memory 121. The internal memory 121 may include a storage program area and a storage data area. The storage program area may store an operating system, an application program required by at least one function (for example, a sound play function and an image display function), and the like. The storage data area may store data (for example, audio data, a phone book, and the like) created during use of the electronic device 100. In addition, the internal memory 121 may include a high-speed random access memory, and may further include a non-volatile memory, for example, at least one magnetic disk storage device, a flash memory device, and a universal flash storage (universal flash storage, UFS).

The electronic device 100 may use the audio module 170, the speaker 170A, the receiver 170B, the microphone 170C, the headset jack 170D, the application processor, and the like to implement audio functions, for example, music playing and sound recording.

The pressure sensor 180A is configured to sense a pressure signal, and can convert the pressure signal into an electrical signal. In some embodiments, the pressure sensor 180A may be disposed on the display 194.

The gyroscope sensor 180B may be configured to determine a movement posture of the electronic device 10. In some embodiments, the gyroscope sensor 180B may be configured to determine an angular velocity of the electronic device 100 around three axes (namely, x, y, and z axes). The gyroscope sensor 180B may be configured to achieve anti-shake during photographing. The gyroscope sensor 180B may also be configured for navigation and a motion sensing game scenario.

The barometric pressure sensor 180C is configured to measure a barometric pressure. In some embodiments, the electronic device 100 calculates an altitude, to assist positioning and navigation, based on a barometric pressure value measured by the barometric pressure sensor 180C.

The magnetic sensor 180D may include a Hall sensor. The electronic device 100 may detect opening or closing of a flip holster by using the magnetic sensor 180D.

The acceleration sensor 180E can detect acceleration values of the electronic device 100 in all directions (generally in three axes). When being still, the electronic device 100 can detect magnitude and a direction of gravity, and may further be configured to identify a posture of the electronic device. This is applied to applications such as horizontal and vertical screen switching and a pedometer.

The distance sensor 180F is configured to measure a distance. The electronic device 100 may measure a distance by using infrared or laser light. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light to the outside by using the light emitting diode. The electronic device 100 detects infrared reflected light from a nearby object by using the photodiode, to automatically turn off a screen to save power. The optical proximity sensor 180G may alternatively be used in a holster mode or a pocket mode to automatically unlock or lock a screen.

The ambient light sensor 180L is configured to sense brightness of ambient light. The electronic device 100 may adaptively adjust brightness of the display 194 based on sensed brightness of ambient light. The ambient light sensor 180L may also be configured to automatically adjust white balance during photographing. The ambient light sensor 180L may further cooperate with the optical proximity sensor 180G, to detect whether the electronic device 100 is in a pocket to prevent a false touch.

The fingerprint sensor 180H is configured to collect a fingerprint. The electronic device 100 may implement fingerprint unlock, application lock accessing, fingerprint photographing, fingerprint-based call answering, and the like based on a characteristic of a collected fingerprint.

The temperature sensor 180J is configured to detect a temperature. In some embodiments, the electronic device 100 performs a temperature handling policy based on a temperature detected by the temperature sensor 180J.

The touch sensor 180K is also called a "touch panel". The touch sensor 180K may be disposed on the display 194. The touch sensor 180K and the display 194 form a touchscreen, also known as a "touch screen". The touch sensor 180K is configured to detect a touch operation acting on or near the display. The touch sensor can transmit a detected touch operation to the application processor to determine a type of a touch event. Visual output related to the touch operation may be provided by using the display 194. In some other embodiments, the touch sensor 180K may be alternatively disposed on a surface of the electronic device 100, in a position different from that of the display 194.

The bone conduction sensor 180M may obtain a vibration signal. In some embodiments, the bone conduction sensor 180M may obtain a vibration signal of a vocal vibrating bone of a human body.

Because a color of an object changes with a color of projected light, pictures taken in different scenarios reflect different color temperatures, and a CCD circuit or a CMOS circuit in a digital camera or a camera of a mobile phone cannot correct a change of a color of a light source. Therefore, to prevent a color cast of a photographed image, it is often necessary to process an image by using a white balance algorithm specified in the digital camera or the mobile phone to correct the color cast of the image.

White balance is to offset a color cast of a photographed image by adjusting a signal gain corresponding to a color temperature inside a camera under different color temperature conditions, so that the photographed image is more adaptive to a visual habit of human eyes. Because a camera is not as intelligent as human eyes (the human eyes automatically correct a color when seeing an object), the camera specifies a range. If an average color value of a photographed picture falls within the specified range, a color of the photographed picture does not need to be corrected. If the average color value of the photographed picture deviates from the range, a parameter needs to be adjusted, so that the average color value of the photographed picture falls within the range. This is a process of correcting white balance. For example, a red-green-blue three-color value of a light source (RGB of the light source) of an adjusted image is (25, 50, 150), and a ratio value of red, green, and blue light of the light source is 1:2:6. Therefore, a color of the image is kind of blue compared with that actually observed by human eyes. To resolve a color cast problem of an image, the image is processed by using an AWB algorithm in a mobile phone, and RGB_GAIN of a light source of the image is output, so that an ISP can adjust an RGB value of the image based on RGB_GAIN, thereby correcting a color cast generated in the image. RGB_GAIN is three gain values. For example, RGB_GAIN of a light source is (6, 3, 1), and RGB of an original image is (25, 50, 150). RGB of the original image is multiplied by RGB_GAIN of the light source to obtain adjusted RGB (150, 150, 150) of the original image, that is, white points in the image have equal RGB, thereby eliminating a color cast.

To resolve a color cast problem of an image, a CCT of an image light source needs to be accurately calculated first, then RGB_GAIN of the image is calculated based on the CCT, and finally RGB of each pixel of the image is multiplied by RGB_GAIN, to adjust an overall color of the image, and resolve the color cast problem of the image. The CCT of the image light source is calculated by a processor based on spectral data output by a spectral sensor. The spectral sensor is disposed inside an electronic device. When a user performs photographing by using the electronic device, light in an external environment enters the spectral sensor through a camera. After receiving the light, a radiation sensitive element in the spectral sensor makes a response and outputs related data. The data is the spectral data output by the spectral sensor. Currently, common spectral sensors include an AS7341 spectral sensor, an SC4236 spectral sensor, and the like. A process in which an electronic device calculates RGB_GAIN of an image based on spectral data output by a spectral sensor is described below with reference to FIG. 2.

Figure 2:
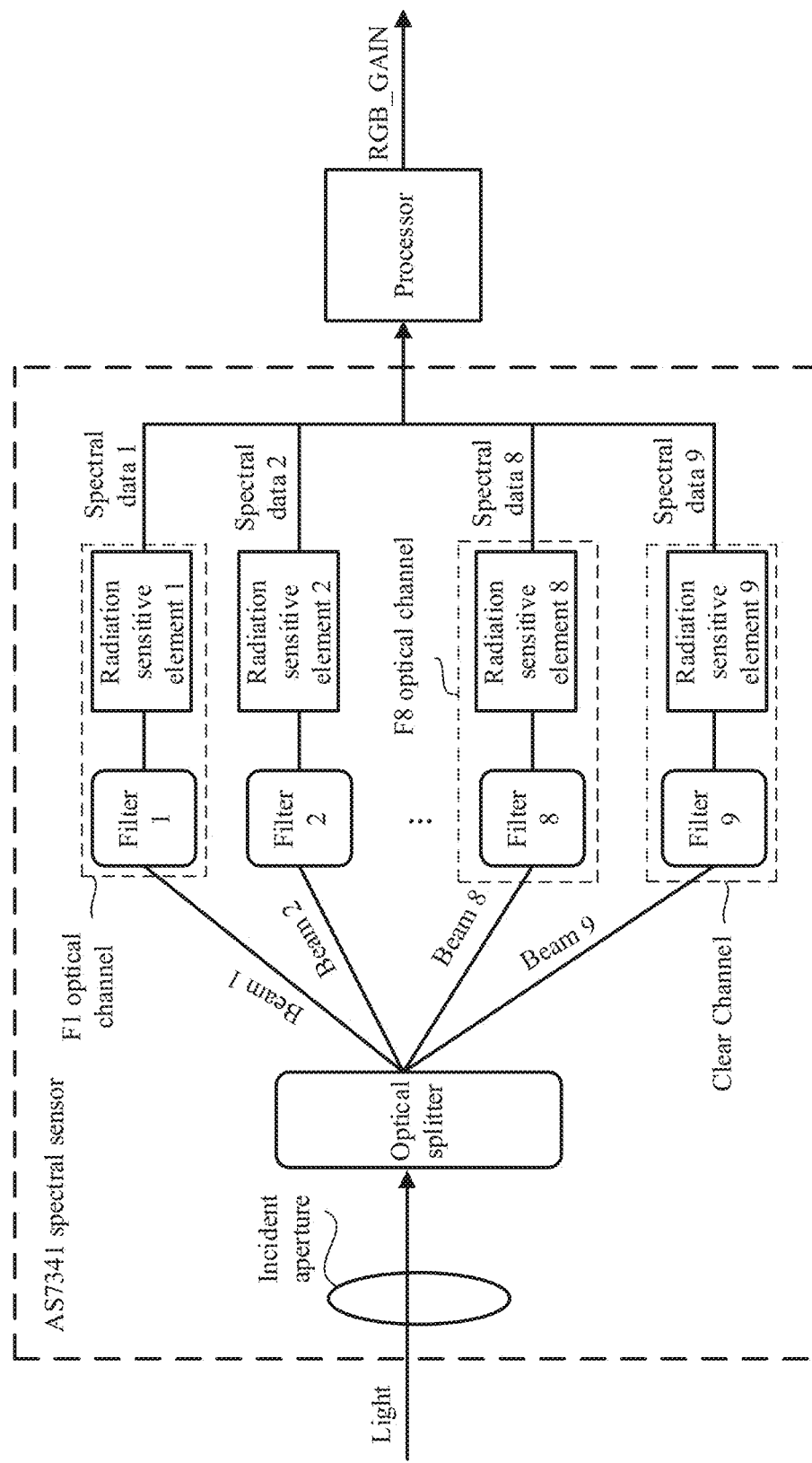
FIG. 2 is a diagram of a system architecture for calculating RGB_GAIN of an image light source according to an embodiment of this application.

FIG. 2 is a diagram of a system architecture for calculating RGB_GAIN of an image light source according to an embodiment of this application. The diagram of the system architecture includes an AS7341 spectral sensor and a processor. As shown in FIG. 2, the AS7341 spectral sensor includes eight visible optical channels (an F1 optical channel to an F8 optical channel) and one Clear channel. The F1 optical channel to the F8 optical channel respectively correspond to filters (a filter 1 to a filter 8) and radiation sensitive elements (a radiation sensitive element 1 to a radiation sensitive element 8), and the Clear channel corresponds to a filter 9 and a radiation sensitive element 9. Each filter is provided with a different wavelength range, and the wavelength range of the filter is consistent with a wavelength range of a corresponding optical channel. Only light within the wavelength range can be transmitted through the filter. A wavelength range of the filter corresponding to the Clear channel is greater than a wavelength range of a filter corresponding to a visible optical channel. For example, if a wavelength range of a filter is 300 nm to 350 nm, the filter allows only light within the wavelength range of 300 nm to 350 nm to pass through. The filter reflects light within another wavelength range.

Figure 3:
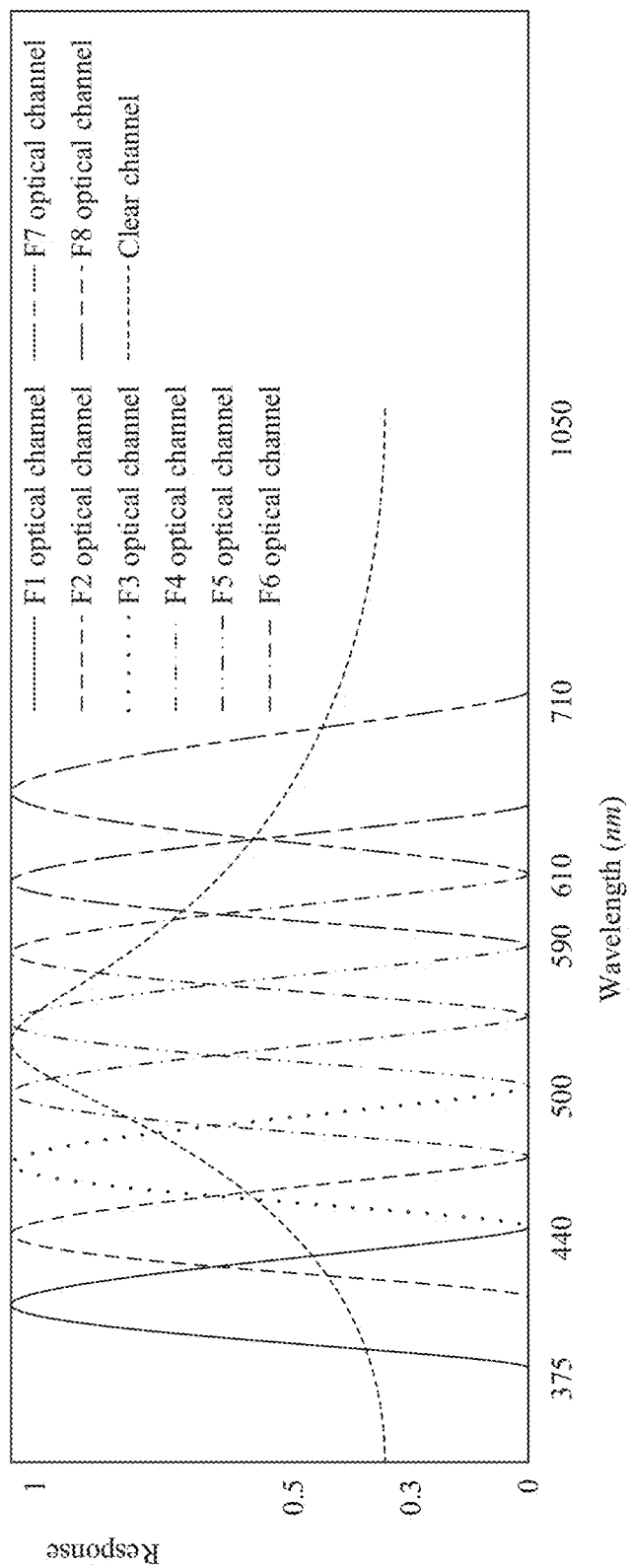
FIG. 3 is a diagram of a response function of an AS7341 spectral sensor according to an embodiment of this application.

As shown in FIG. 2, light in a photographing environment enters the spectral sensor through an incident aperture, and an optical splitter splits, into a plurality of beams, the light incident into the spectral sensor. The plurality of beams are projected onto the optical filters. Because each filter is provided with a different wavelength range, the filter allows only light that is in a beam and whose wavelength is within the wavelength range of the filter to be transmitted, and the filter reflects light with another wavelength. When light is irradiated through a filter to a radiation sensitive element, the radiation sensitive element makes a response and outputs an amplitude of the response. The amplitude of the response is spectral data output through an optical channel. FIG. 3 is a diagram of a response function of the AS7341 spectral sensor according to an embodiment of this application. It can be learned from FIG. 3 that a wavelength range of the F1 optical channel is about 375 nm to 455 nm, a wavelength range of the F2 optical channel is about 410 nm to 470 nm, a wavelength range of the F3 optical channel is about 440 nm to 500 nm, a wavelength range of the F4 optical channel is about 470 nm to 550 nm, a wavelength range of the F5 optical channel is about 500 nm to 590 nm, a wavelength range of the F6 optical channel is about 550 nm to 610 nm, a wavelength range of the F7 optical channel is about 590 nm to 680 nm, a wavelength range of the F8 optical channel is about 610 nm to 710 nm, and a wavelength range of the Clear channel is about 350 nm to 1050 nm. A beam includes at least seven types of visible light, namely, red, orange, yellow, green, blue, indigo, and violet visible light, respectively corresponding to wavelength ranges of 622 nm to 780 nm, 597 nm to 622 nm, 577 nm to 597 nm, 492 nm to 577 nm, 455 nm to 492 nm, 455 nm to 492 nm, and 400 nm to 455 nm. When a beam is irradiated to the filter 1, because the wavelength range of the filter 1 is 375 nm to 455 nm (the wavelength range of the F1 optical channel), the filter 1 allows only violet light in the beam to pass through. When the violet light is irradiated to the radiation sensitive element 1, the radiation sensitive element outputs an excitation value based on a response function of the F1 optical channel. The excitation value is spectral data 1 output by the F1 optical channel. Similarly, the F2 optical channel to the F8 optical channel and the Clear channel respectively output spectral data 2 to spectral data 9, and send the spectral data 1 to the spectral data 9 to the processor, thereby implementing conversion from an optical signal to an electrical signal.

Spectral data output by the spectral sensor is bare data. It can be learned from FIG. 3 that the bare data is in a small amplitude range (an amplitude range of the bare data is 0 to 1). An amplitude of the bare data is quite small. This means that a relative proportion of noise (including dark current noise, analog amplifier noise, digital-to-analog conversion noise, and the like) in the bare data increases. This indicates that most of the collected data is invalid data, resulting in an inaccurate calculation result of a CCT, and further affecting accuracy of RGB_GAIN calculated based on the CCT. Therefore, to resolve the foregoing problem, before calculating the CCT, the electronic device multiplies one piece of Analog_Gain (an analog gain) by the bare data output through each of the F1 optical channel to the F8 optical channel, to amplify the bare data. An effect achieved by multiplying the bare data by the analog gain is equivalent to an effect achieved by adjusting ISO or using a film with higher photosensitivity. This helps increase a signal-to-noise ratio of spectral bare data. When the analog gain is used to amplify the spectral bare data, amplified bare data includes more useful signals due to an increase of the signal-to-noise ratio (the proportion of noise decreases). When the processor calculates the CCT of the image light source based on the amplified bare data, an obtained CCT has higher accuracy.

After the electronic device amplifies the spectral data 1 to the spectral data 8 by using the analog gains, interpolation calculation is performed on eight pieces of amplified spectral data to obtain a plurality of pieces of finer spectral data. The plurality of pieces of finer spectral data are obtained by performing finer classification on the original eight pieces of spectral data. For example, the spectral data 1 is an excitation value output when the wavelength range is 400 nm to 455 nm. The processor performs interpolation on the amplified spectral data 1, to refine the spectral data 1 into a plurality of pieces of spectral data. A larger quantity of pieces of refined spectral data indicates higher accuracy of the CCT calculated by the processor based on the spectral data. For example, the amplified spectral data 1 corresponds to a wavelength range of 400 nm to 455 nm. When interpolation calculation is performed on the amplified spectral data 1, spectral data 11, spectral data 12, and spectral data 13 may be obtained. These pieces of spectral data respectively correspond to wavelength ranges of 400 nm to 425 nm, 425 nm to 440 nm, and 440 nm to 455 nm. In this way, the spectral data 1 is divided into the spectral data with the three wavelength ranges. To be specific, the violet-light spectral data with the wavelength range of 400 nm to 455 nm is divided into the violet-light spectral data with the wavelength range of 400 nm to 425 nm, the violet-light spectral data with the wavelength range 425 nm to 440 nm, and the violet-light spectral data with the wavelength range of 440 nm to 455 nm. Likewise, interpolation calculation may be performed on the amplified spectral data 2 to the amplified spectral data 8 to obtain a plurality of pieces of spectral data. In this way, useful data in the spectral data is increased. Then, the processor integrates, with a standard observer curve (an XYZ curve) of human eyes, the spectral data obtained through interpolation calculation, to obtain an XYZ three-dimensional vector of the image light source in an XYZ space. The three-dimensional vector is independent of the device, and the CCT of the image light source is calculated based on the three-dimensional vector. The CCT calculated based on the XYZ three-dimensional vector is consistent with perception of a human visual system.

Application scenarios of an algorithm for adjusting an exposure parameter of a spectral sensor are described below with reference to FIG. 4A to FIG. 4D.

Figure 4A:
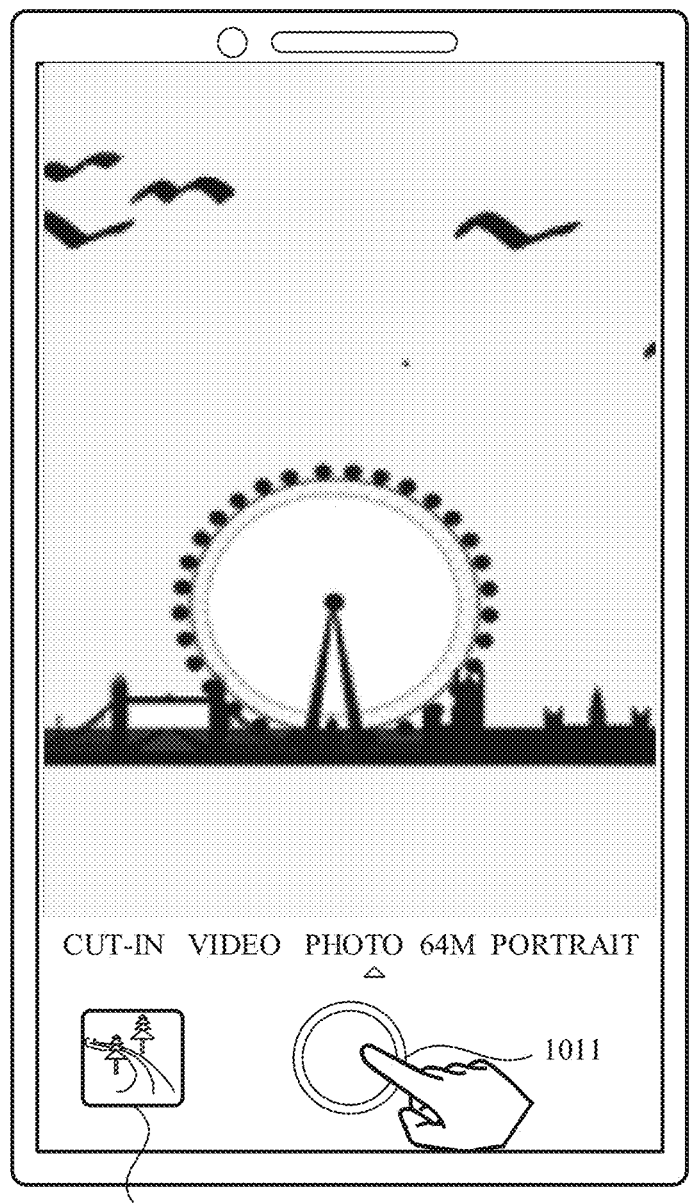
FIG. 4A to FIG. 4D are diagrams of application scenarios of an algorithm for adjusting an exposure parameter of a spectral sensor.
Figure 4B:
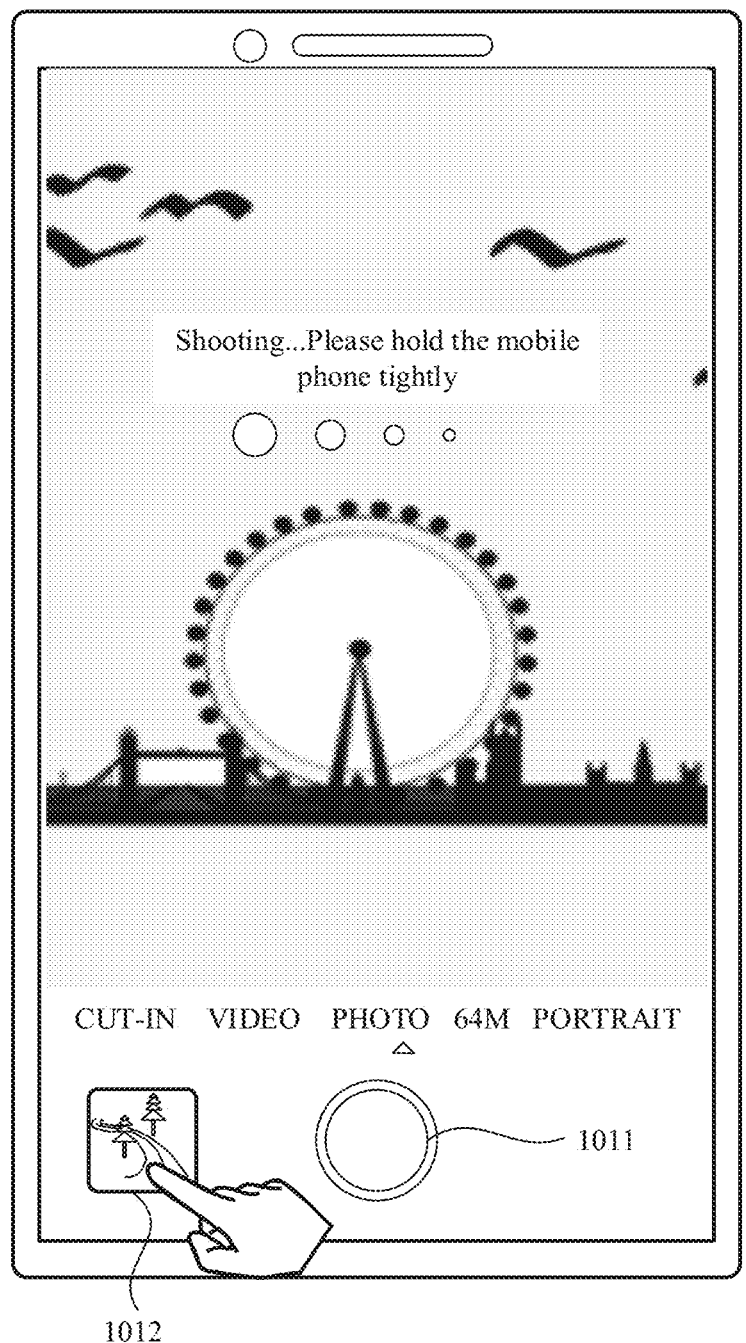
Figure 4C:
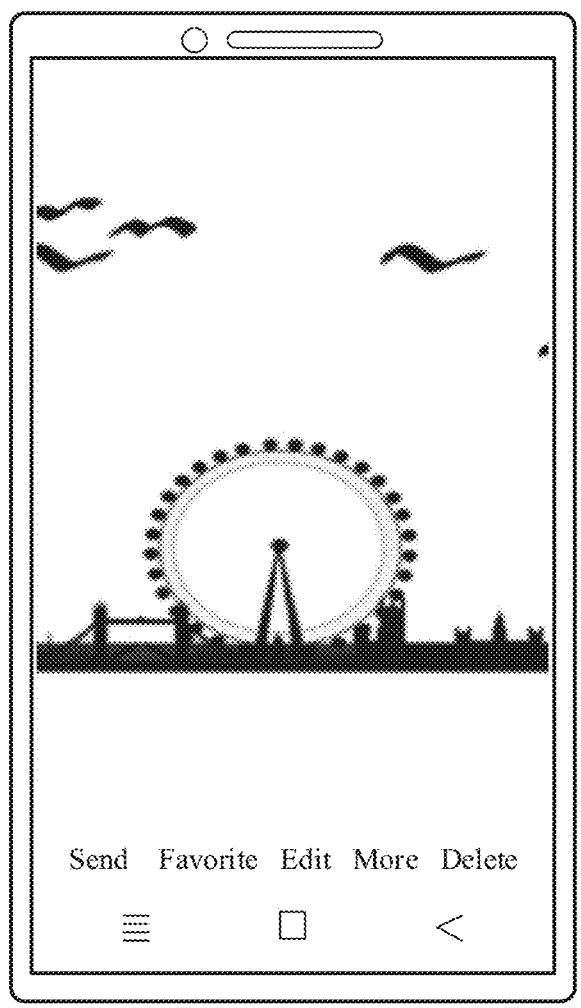

FIG. 4A is a diagram of a photographing interface of the electronic device 100. A current photographing environment is a night scene. The photographing interface includes a photographing control 1011 and a preview control 1012. When the electronic device 100 detects an input operation (for example, a tap) targeted for the photographing control 1011, the electronic device 100 starts photographing and displays a photographing processing interface, as shown in FIG. 4B. As shown in FIG. 4B, the photographing processing interface displays prompt text "Shooting . . . Please hold the mobile phone tightly". When photographing is completed, the electronic device 100 displays a picture preview interface in FIG. 4C after detecting an input operation (for example, a tap) targeted for the preview control 1012.

Figure 4D:
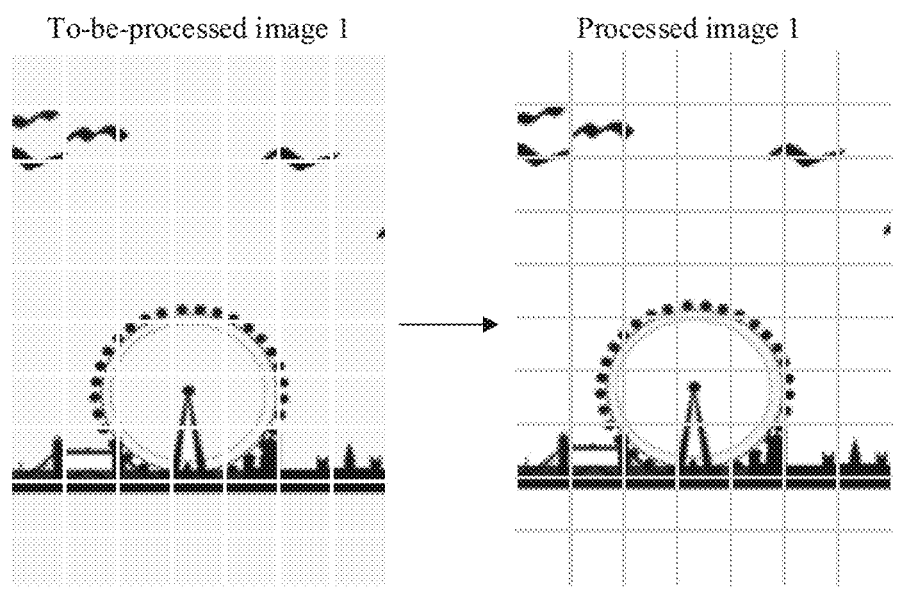

When the electronic device 100 displays the photographing processing interface shown in FIG. 4B, the electronic device extends an exposure time, so that the multispectral sensor can obtain spectral data in the night scene, further calculate an RGB_GAIN value of an image light source, and correct a color cast of an image based on the RGB_GAIN value. As shown in FIG. 4D, an overall color of an unprocessed image photographed in the night scene is kind of grey, and an overall color of an image processed based on the RGB_GAIN value is improved.

Figure 5A:
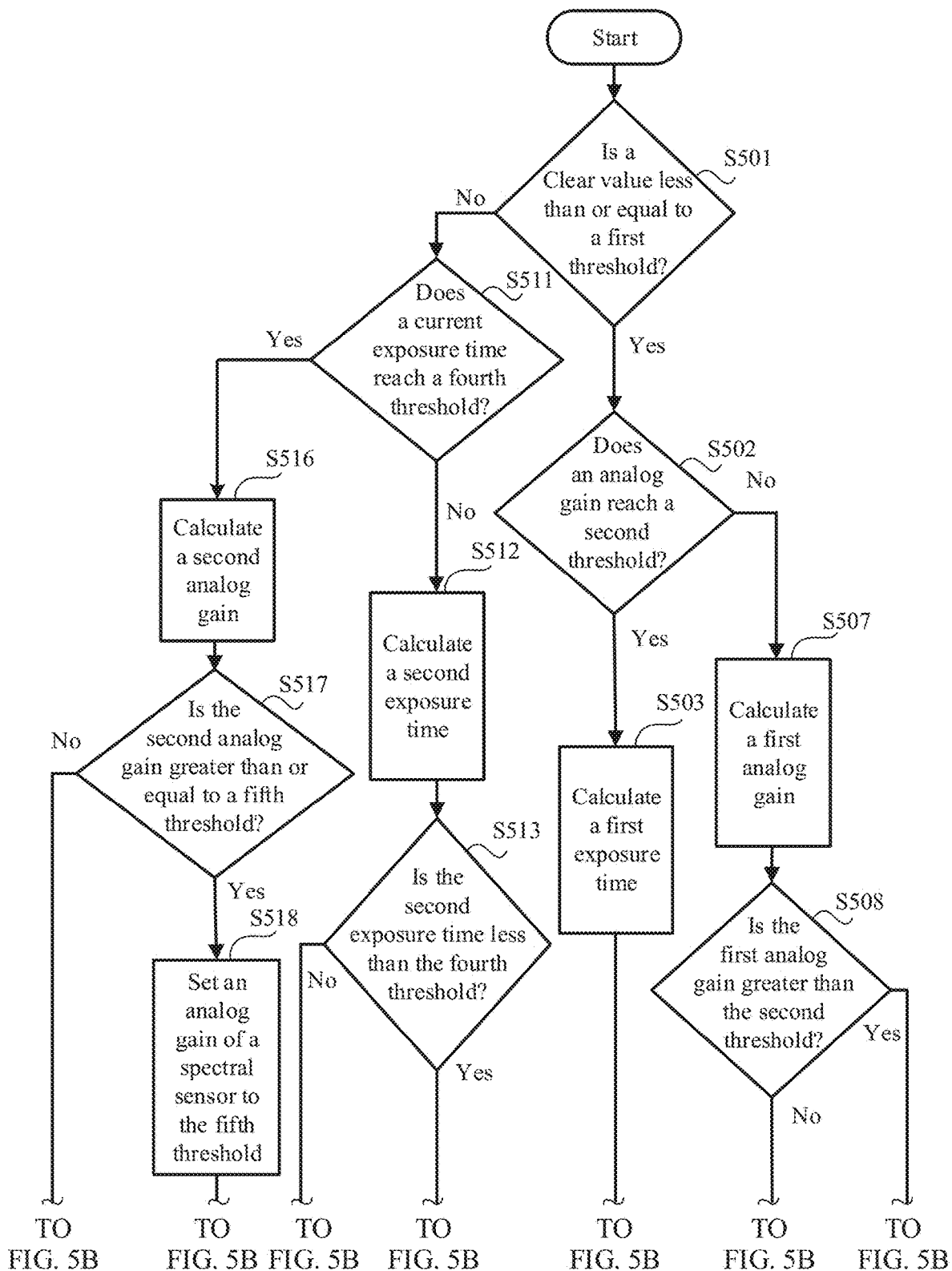
FIG. 5A and FIG. 5B are a schematic flowchart for dynamically adjusting an exposure parameter of a spectral sensor according to an embodiment of this application.
Figure 5B:
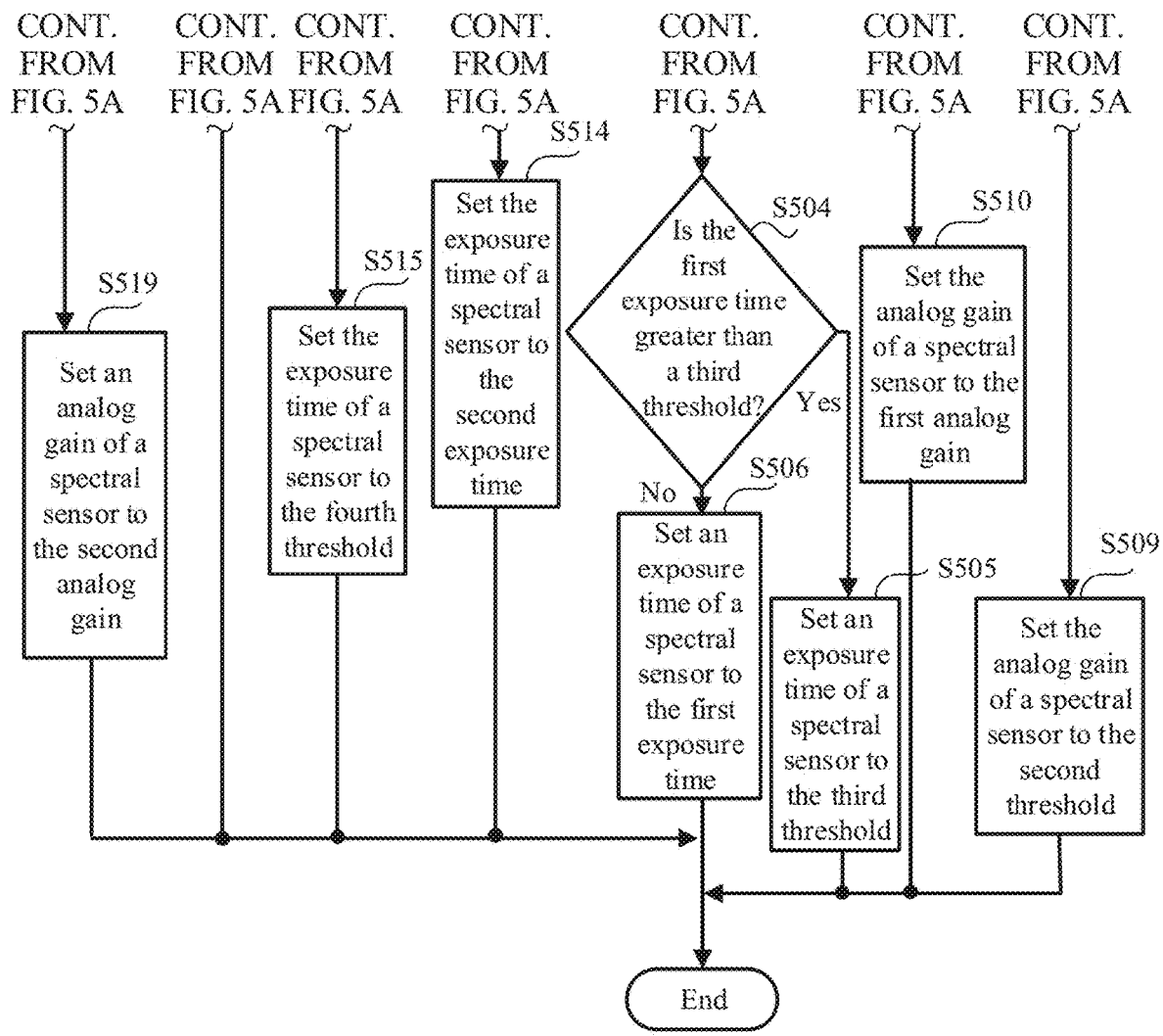

FIG. 5A and FIG. 5B are a schematic flowchart for dynamically adjusting an exposure parameter of a spectral sensor according to an embodiment of this application. A procedure is described below with reference to FIG. 5A and FIG. 5B.

Step S501: An electronic device determines whether a Clear value is less than or equal to a first threshold.

Specifically, if the Clear value is less than or equal to the first threshold, step S502 is performed; or if the Clear value is not less than or equal to the first threshold, step S511 is performed.

The Clear value is spectral data output through a Clear Channel of the spectral sensor. A wavelength range corresponding to the Clear channel is wide. For example, a wavelength range of a Clear channel of an AS7341 spectral sensor includes almost all wavelength ranges of visible light. Therefore, intensity of light in a photographing environment may be measured based on the Clear value output through the Clear channel. When the Clear value is greater than the first threshold, the electronic device determines that the photographing environment is a strong light environment. When the Clear value is less than or equal to the first threshold, the electronic device determines that the photographing environment is a weak light environment. The first threshold may be obtained based on historical data, or may be obtained through experimental data analysis. Value settings of the first threshold are not limited in this embodiment of this application.

Because color temperatures of different light sources are different, images photographed m different photographing environments have a color cast problem. To resolve the problem, the electronic device adjusts white balance of the images. During photographing, the electronic device first obtains spectral data of a photographing environment by using a spectral sensor in a camera, and then a processor calculates a CCT of the photographing environment based on the spectral data, and adjusts a color of an image based on the CCT. Photographing environments are classified into a strong light environment and a weak light environment. Exposure parameters (an exposure time and an analog gain) of the spectral sensor are dynamically adjusted based on different photographing environments. This helps obtain highly accurate spectral data, thereby obtaining an extremely highly accurate CCT of an image light source through calculation.

Step S502 to Step S510 are steps performed by the electronic device when the photographing environment is a weak light environment (the Clear value is less than or equal to the first threshold).

Step S502: The electronic device determines whether a current analog gain of the spectral sensor reaches a second threshold.

Specifically, if the current analog gain of the spectral sensor reaches the second threshold, step S503 is performed, or if the current analog gain of the spectral sensor does not reach the second threshold, step S507 is performed.

The second threshold is an upper threshold of the analog gain, and the second threshold may be obtained based on historical data, experimental data, or an empirical value. This is not limited in this embodiment of this application.

An optical channel of the spectral sensor outputs a response after receiving light within a wavelength range specified for the optical channel. The response is spectral data output through the optical channel. However, the response output through the optical channel is bare data, and a value of the bare data is extremely small. If the processor calculates a CCT of an image light source based on the bare data, the calculated CCT has low accuracy, resulting in a color cast of an image. To resolve the problem, the spectral data (the bare data) output through the optical channel usually needs to be amplified, to improve accuracy of calculating the CCT of the image light source by the processor. A most common manner is to multiply the bare data by an analog gain.

However, a larger value of the analog gain does not mean that the CCT has higher accuracy. When the bare data output through the optical channel is amplified, conversion noise in the bare data is also amplified. The conversion noise is an error of the sensor in conversion from an optical signal to an electrical signal. If the analog gain is excessively large, noise in the spectral data is excessively large. This affects accuracy of the CCT. If the analog gain is excessively small, the bare data is not amplified enough. This affects not only accuracy of the bare data but also accuracy of the CCT. Therefore, when the analog gain of the multispectral sensor does not reach the upper threshold, the analog gain of the multispectral sensor needs to be increased, to prevent a signal-to-noise ratio of the spectral bare data from being excessively small, affecting accuracy of the CCT.

Step S503: The electronic device calculates a first exposure time.

Specifically, as described in step S502, if the analog gain is excessively large, a proportion of noise in the spectral data is excessively large. This affects accuracy of the CCT of the image light source. Therefore, if the analog gain of the spectral sensor has reached a maximum value in a weak light photographing environment, the exposure time of the spectral sensor may be appropriately extended to improve accuracy of calculating the CCT of the image light source by the processor. In the weak light photographing environment, extending the exposure time can increase an amount of admitted light of the multispectral sensor, and the spectral sensor can capture more sufficient spectral data, thereby making spectral data output through some optical channels more accurate. When the processor calculates the CCT of the image light source based on spectral data amplified by using the analog gain, a calculated CCT is more accurate.

The first exposure time is a target value of an exposure time to be adjusted, and the first exposure time may be obtained according to a formula (1). The formula (1) is as follows:

$$\text{Exop\_1'} = \text{Expo} * X \quad (1),$$

where

Expo is a current exposure time of the spectral sensor, Exop' is the first exposure time, and X is a first gain coefficient greater than 1. X may be obtained based on an empirical value, historical data, or experimental data. This is not limited in this embodiment of this application.

Step S504: The electronic device determines whether the first exposure time is greater than a third threshold.

Specifically, if the first exposure time is greater than the third threshold, step S505 is performed; or if the first exposure time is not greater than the third threshold, step S506 is performed.

The third threshold may be an upper threshold of the exposure time. The third threshold may be obtained based on an empirical value, historical data, or experimental data. This is not limited in this embodiment of this application.

As described in step S503, increasing the exposure time can increase the amount of admitted light of the spectral sensor. However, an excessively long exposure time may result in an excessive amount of admitted light of the spectral sensor, and cause overexposed pixels, and consequently an overall color of the image is kind of white. For example, when the sun is photographed at noon, the photographed sun and a surrounding area thereof are both white because a light signal is excessively strong and exceeds a maximum value of the response of the spectral sensor, causing the image to become white. An excessively short exposure time may result in missing or inaccurate spectral bare data output through the optical channel. This further affects accuracy of the CCT of the image light source. Therefore, the exposure time should not exceed the specified upper threshold and a lower threshold. The upper threshold of the exposure time is the third threshold.

Step S505: The electronic device sets the exposure time of the spectral sensor to the third threshold.

Specifically, if the first exposure time exceeds the preset upper threshold (the third threshold) of the exposure time, and if the electronic device sets the exposure time of the spectral sensor to the first exposure time, "overexposure" of an image is caused. As a result, an overall color of the image is kind of white. Therefore, the electronic device sets the exposure time to the upper threshold (the third threshold) of the exposure time. In this way, the amount of admitted light of the spectral sensor is increased, and in addition, the following problem is eliminated: overexposure occurs in the image due to an excessive amount of admitted light, and consequently the overall color of the image is kind of white.

Step S506: The electronic device sets the exposure time of the spectral sensor to the first exposure time.

Specifically, when the first exposure time does not exceed the third threshold, the electronic device sets the exposure time of the spectral sensor to the first exposure time. This can properly increase the amount of admitted light of the spectral sensor, so that the spectral bare data output through the optical channel is more accurate and comprehensive. When the processor calculates the CCT of the image light source based on the bare data amplified by using the analog gain, the calculated CCT is extremely highly accurate, thereby resolving the color cast problem of the image.

Step S507: The electronic device calculates a first analog gain.

Specifically, in the foregoing step S502, when the analog gain of the spectral sensor does not reach the upper threshold (the second threshold) of the analog gain, the electronic device may appropriately increase a value of the analog gain of the spectral sensor under a weak light condition, amplify, to a proper value range, the spectral bare data output through the optical channel of the spectral sensor, and increase the signal-to-noise ratio of the spectral bare data. When the processor calculates the CCT of the image light source based on the bare data amplified by using the analog gain, the calculated CCT is more accurate.

The first analog gain is a target value of the analog gain to be adjusted, and the first analog gain may be obtained according to a formula (2). The formula (2) is as follows:

$$\text{Gain\_1'} = \text{Gain} * Y \quad (2),$$

where

Gain is a current analog gain of the spectral sensor, Gain_1' is the first analog gain, and Y is a second gain coefficient greater than 1. Y may be obtained based on an empirical value, historical data, or experimental data. This is not limited in this embodiment of this application.

Step S508: The electronic device determines whether the first analog gain is greater than the second threshold.

Specifically, if the first analog gain is greater than the second threshold, step S509 is performed; or if the first analog gain is not greater than the second threshold, step S510 is performed.

As described in step S502, a larger value of the analog gain does not mean that the CCT has higher accuracy. When the spectral bare data output through the optical channel is amplified, conversion noise in the spectral bare data is also amplified. The conversion noise is an error of the sensor in conversion from an optical signal to an electrical signal. If the analog gain is excessively large, the signal-to-noise ratio of the bare data amplified by using the analog gain decreases. This affects accuracy of the CCT of the image light source.

Step S509: The electronic device sets the analog gain of the spectral sensor to the second threshold.

Specifically, if the first analog gain is greater than the upper threshold (the second threshold) of the analog gain, the signal-to-noise ratio of the spectral bare data decreases, and a proportion of an unwanted signal increases. This affects accuracy of the CCT calculated by the processor based on the amplified spectral bare data. Therefore, the electronic device sets the analog gain to the second threshold. This not only amplifies the spectral bare data, but also improves the signal-to-noise ratio of the bare data to some extent, thereby ensuring accuracy of calculating the CCT of the image light source by the processor.

Optionally, when the photographing environment is a weak light environment, the electronic device may also extend the exposure time of the camera of the electronic device while adjusting the analog gain. If the current exposure time of the electronic device does not exceed the third threshold, the electronic device may calculate the first exposure time according to the formula (1). If the first exposure time exceeds the third threshold, the exposure time of the camera of the electronic device is set to the third threshold; or if the first exposure time does not exceed the third threshold, the exposure time of the camera of the electronic device is set to the first exposure time.

Step S510: The electronic device sets the analog gain of the spectral sensor to the first analog gain.

Specifically, when the photographing environment is a weak light environment, if the first analog gain is less than the second threshold, the electronic device sets the analog gain of the camera to the first analog gain. In this way, the electronic device can amplify, to a proper value range based on the first analog gain, the bare data output through the optical channel, and the processor can accurately calculate the CCT of the image light source based on the amplified bare data, so that an adjustment effect achieved by an ISP on white balance of the image is better.

Optionally, when the photographing environment is a weak light environment, the electronic device may also extend the exposure time of the camera of the electronic device while adjusting the analog gain. If the current exposure time of the electronic device does not exceed the third threshold, the electronic device may calculate the first exposure time according to the formula (1). If the first exposure time exceeds the third threshold, the exposure time of the camera of the electronic device is set to the third threshold; or if the first exposure time does not exceed the third threshold, the exposure time of the camera of the electronic device is set to the first exposure time.

Step S511 to Step S519 are steps performed by the electronic device when the photographing environment is a strong light environment (the Clear value is greater than the first threshold).

Step S511: The electronic device determines whether a current exposure time of the spectral sensor reaches a fourth threshold.

Specifically, if the current exposure time of the spectral sensor reaches the fourth threshold, it indicates that current exposure time of the spectral sensor is a lower threshold of the exposure time, and step S516 is performed: or if the current exposure time of the spectral sensor does not reach the fourth threshold, it indicates that the current exposure time of the spectral sensor is greater than a lower threshold of the exposure time, and step S512 is performed. The fourth threshold is the lower threshold of the exposure time, and may be obtained based on historical data, experimental data, or an empirical value. This is not limited in this embodiment of this application.

In a strong light environment, even if the exposure time is very short, the spectral sensor may have a large amount of admitted light. When the amount of admitted light of the spectral sensor is excessively large, a pixel of the image may be overexposed. This causes an overall color of the image to be kind of white. Therefore, the electronic device needs to determine whether the current exposure time of the camera of the electronic device reaches the lower threshold (the fourth threshold) of the exposure time. If the lower threshold is not reached, the exposure time of the spectral sensor needs to be adjusted.

Step S512: The electronic device calculates a second exposure time.

Specifically, as described in step S511, when the photographing environment is a strong light environment, the exposure time needs to be shortened and the amount of admitted light of the spectral sensor needs to be reduced. The second exposure time is a target value of the exposure time to be adjusted, and the second exposure time may be obtained according to a formula (3). The formula (3) is as follows:

$$\text{Exop\_2'}=\text{Expo}*X' \quad (3),$$

where

Expo is a current exposure time of the spectral sensor, X' is a third gain coefficient less than 1, and Exop_2' is the second exposure time. X' may be obtained based on an empirical value, historical data, or experimental data. This is not limited in this embodiment of this application.

Step S513: The electronic device determines whether the second exposure time is less than the fourth threshold.

Specifically, if the second exposure time is less than the fourth threshold, step S514 is performed; or if the second exposure time is not less than the fourth threshold, step S515 is performed.

Step S514: The electronic device sets the exposure time of the spectral sensor to the second exposure time.

Specifically, if the second exposure time is greater than the fourth threshold, the electronic device sets the exposure time of the camera of the electronic device to the second exposure time. Properly reducing the exposure time of the camera in a strong light environment can avoid an overall color of the image being kind of white due to an excessively long exposure time, improve accuracy of the spectral bare data output through the optical channel, and further improve accuracy of calculating the CCT of the image light source by the processor.

Optionally, when the photographing environment is a strong light environment, the electronic device may reduce the analog gain of the electronic device while adjusting the exposure time. If a current analog gain of the electronic device is greater than a fifth threshold (a lower threshold of the analog gain), the electronic device may calculate a second analog gain according to a formula (4). If the second analog gain exceeds the fifth threshold, the exposure time of the camera of the electronic device is set to the second analog gain; or if the second analog gain does not exceed the fifth threshold, the analog gain of the camera of the electronic device is set to the fifth threshold.

Step S515: The electronic device sets the exposure time of the spectral sensor to the fourth threshold.

Specifically, as described in the foregoing steps S511 and S514, properly reducing the exposure time of the camera in a strong light environment can avoid an overall color of the image being kind of white due to an excessively long exposure time, improve accuracy of the spectral bare data output through the optical channel, and further improve accuracy of calculating the CCT of the image light source by the processor. However, an excessively short exposure time (less than the fourth threshold) may result in missing or inaccurate spectral bare data output through the optical channel. This further affects accuracy of the CCT of the image light source. If the exposure time of the camera of the electronic device is set to the second exposure time when the second exposure time is less than the fourth threshold, accuracy of the CCT of the image light source is affected. Therefore, when the second exposure time is less than the fourth threshold, the electronic device sets the exposure time of the camera of the electronic device to the fourth threshold.

Optionally, when the photographing environment is a strong light environment, the electronic device may reduce the analog gain of the electronic device while adjusting the exposure time. If a current analog gain of the electronic device is greater than a fifth threshold (a lower threshold of the analog gain), the electronic device may calculate a second analog gain according to a formula (4). If the second analog gain exceeds the fifth threshold, the exposure time of the camera of the electronic device is set to the second analog gain; or if the second analog gain does not exceed the fifth threshold, the analog gain of the camera of the electronic device is set to the fifth threshold.

Step S516: The electronic device calculates a second analog gain.

In the foregoing step S511, because a current exposure time of the spectral sensor is the fourth threshold (the lower threshold of the exposure time), in the strong light environment, the analog gain may be reduced to improve the accuracy of the CCT of the image light source calculated by the processor. The second analog gain is a target value of the analog gain to be adjusted in the strong light environment, and the second analog gain may be obtained according to the formula (4). The formula (4) is as follows:

$$Gain\_2' = Gain * Y' \qquad (4),$$

where

Gain is a current analog gain of the spectral sensor. Gain_2' is the second analog gain, and Y' is a fourth gain coefficient less than 1. Y' may be obtained based on an empirical value, historical data, or experimental data. This is not limited in this embodiment of this application. In this way, reducing the analog gain under a strong light condition helps control the spectral data (an analog signal), so that after the spectral data is converted into a digital signal, the digital signal can be controlled within a proper value range. In this way, a finally generated image is not overexposed, and an overall color of the image is avoided from being kind of white.

Step S517: The electronic device determines whether the second analog gain is greater than a fifth threshold.

Specifically, if the second analog gain is greater than the fifth threshold, step S518 is performed; or if the second analog gain is not greater than the fifth threshold, step S519 is performed.

The fifth threshold may be a lower threshold of the analog gain. The fifth threshold may be obtained based on an empirical value, historical data, or experimental data. This is not limited in this embodiment of this application.

Step S518: The electronic device sets the analog gain of the spectral sensor to the fifth threshold.

Specifically, under a strong light condition, if the second analog gain is less than the lower threshold (the fifth threshold) of the analog gain, the spectral bare data output through the optical channel of the spectral sensor cannot be amplified to a proper range, and consequently accuracy of the amplified bare data is not high. This affects accuracy of the CCT of the image light source. To resolve the problem, when the second analog gain is less than the fifth threshold, the analog gain is set to the fifth threshold, to ensure that the bare data output through the optical channel can be amplified to a proper value range by using the analog gain, and to ensure accuracy of amplified spectral data.

Step S519: The electronic device sets the analog gain of the spectral sensor to the second analog gain.

Specifically, if the second analog gain is greater than the fifth threshold (the lower threshold of the analog gain) when the photographing environment is a strong light environment, the electronic device sets the analog gain to the second analog gain. In this way, the electronic device can amplify, to a proper value range based on the second analog gain, the bare data output through the optical channel, and the processor can accurately calculate the CCT of the image light source based on amplified bare data, so that an adjustment effect achieved by an ISP on white balance of the image is better.

According to this embodiment of this application, the electronic device determines, based on the spectral data output through the Clear Channel of the spectral sensor, whether the current photographing environment is a strong light environment or a weak light environment. When the current photographing environment is a weak light environment, the electronic device extends the exposure time of the camera of the electronic device or increases the analog gain of the electronic device according to the related formulas. When the current photographing environment is a strong light environment, the electronic device shortens the exposure time of the camera of the electronic device or reduces the analog gain of the electronic device according to the related formulas. In the foregoing manner, the electronic device dynamically adjusts the exposure time and the analog gain of the camera in different photographing environments (a strong light environment/a weak light environment). This helps the spectral sensor output accurate and comprehensive spectral data in the different photographing environments. In this way, the processor can accurately calculate the CCT of the image light source based on the spectral data, thereby accurately adjusting white balance of the image.

Figure 6A:
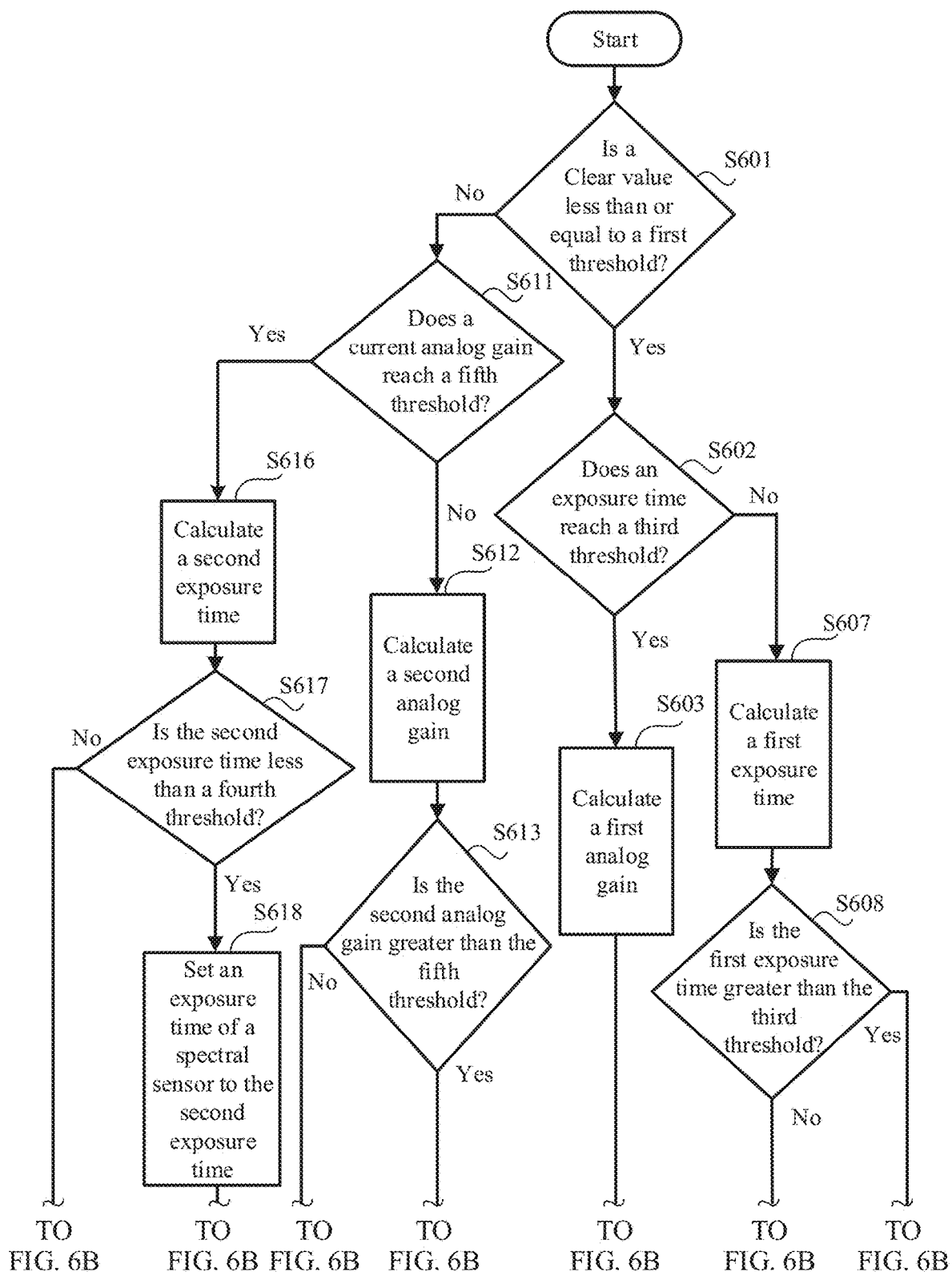
FIG. 6A and FIG. 6B are another schematic flowchart for dynamically adjusting an exposure parameter of a spectral sensor according to an embodiment of this application.
Figure 6B:
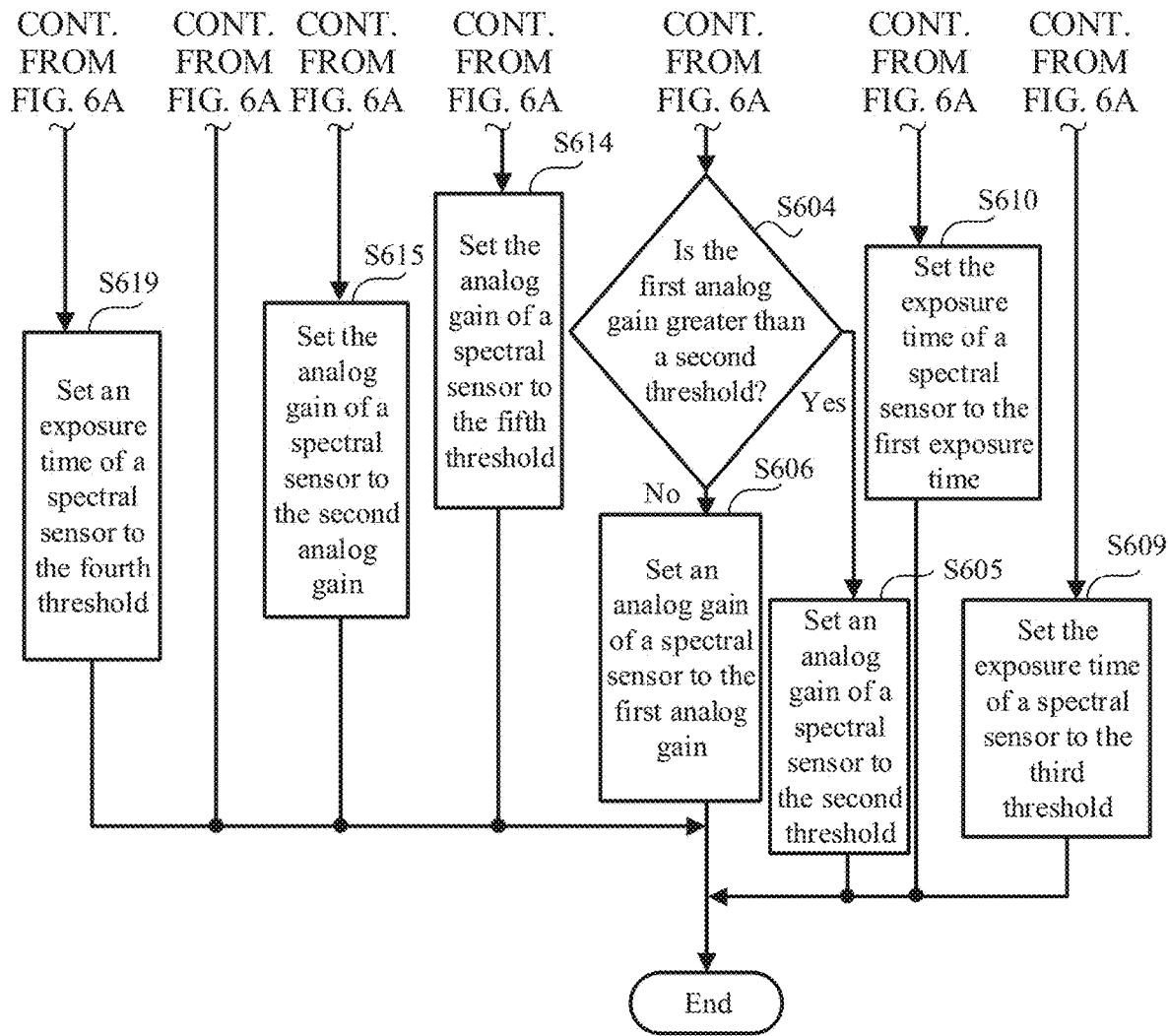

FIG. 6A and FIG. 6B are another schematic flowchart for dynamically adjusting an exposure parameter of a spectral sensor according to an embodiment of this application. A procedure is described below with reference to FIG. 6A and FIG. 6B.

Step S601: An electronic device determines whether a Clear value is less than or equal to a first threshold.

Specifically, for step S601, refer to a related description in step S501. Details are not described herein again in this embodiment of this application. If the Clear value is less than or equal to the first threshold, step S602 is performed; or if the Clear value is not less than or equal to the first threshold, step S611 is performed.

Step S602 to Step S610 are steps performed by the electronic device when a photographing environment is a weak light environment (the Clear value is less than or equal to the first threshold).

Step S602: The electronic device determines whether a current exposure time of the spectral sensor reaches a third threshold.

Specifically, if the current exposure time of the spectral sensor reaches the third threshold, step S603 is performed; or if the current exposure time of the spectral sensor does not reach the third threshold, step S607 is performed.

Step S603: The electronic device calculates a first analog gain.

Specifically, for a process in which the electronic device calculates the first analog gain, refer to step S507. Details are not described herein again in this embodiment of this application.

Step S604: The electronic device determines whether the first analog gain is greater than a second threshold.

Specifically, if the first analog gain is greater than the second threshold, step S605 is performed; or if the first analog gain is not greater than the second threshold, step S606 is performed.

For a related description of determining, by the electronic device, whether the first analog gain is greater than the second threshold, refer to step S508. Details are not described herein again in this embodiment of this application.

Step S605: The electronic device sets an analog gain of the spectral sensor to the second threshold.

Step S606: The electronic device sets the analog gain of the spectral sensor to the first analog gain.

For related descriptions of step S605 and step S606, refer to step S509 and step S510. Details are not described herein again in this embodiment of this application.

Step S607: The electronic device calculates a first exposure time.

Specifically, for a method in which the electronic device calculates the first exposure time, refer to step S503. Details are not described herein again in this embodiment of this application.

Step S608: The electronic device determines whether the first exposure time is greater than the third threshold.

Specifically, if the first exposure time is greater than the third threshold, step S609 is performed; or if the first exposure time is not greater than the third threshold, step S610 is performed.

For a description of determining, by the electronic device, whether the first exposure time is greater than the third threshold, refer to step S504. Details are not described herein again in this embodiment of this application.

Step S609: The electronic device sets the exposure time of the spectral sensor to the third threshold.

Step S610: The electronic device sets the exposure time of the spectral sensor to the first exposure time.

For related descriptions of step S609 and step S610, refer to step S505 and step S506. Details are not described herein again in this embodiment of this application.

Step S611 to Step S619 are steps performed by the electronic device when the photographing environment is a strong light environment (the Clear value is greater than the first threshold).

Step S611: The electronic device determines whether a current analog gain of the spectral sensor reaches a fifth threshold.

Specifically, if the current analog gain of the spectral sensor does not reach the fifth threshold, it indicates that the current analog gain of the spectral sensor is greater than the fifth threshold, and step S612 is performed; or if the current analog gain of the spectral sensor reaches the fifth threshold, step S616 is performed.

Step S612: The electronic device calculates a second analog gain.

Specifically, for a method in which the electronic device calculates the second analog gain of the spectral sensor, refer to step S516. Details are not described herein again in this embodiment of this application.

Step S613: The electronic device determines whether the second analog gain is greater than the fifth threshold.

Specifically, if the second analog gain is greater than the fifth threshold, step S614 is performed; or if the second analog gain is not greater than the fifth threshold, step S615 is performed.

For a related description of determining, by the electronic device, whether the second analog gain is greater than the fifth threshold, refer to step S517. Details are not described herein again in this embodiment of this application.

Step S614: The electronic device sets the analog gain of the spectral sensor to the fifth threshold.

Step S615: The electronic device sets the analog gain of the spectral sensor to the second analog gain.

For related descriptions of step S614 and step S615, refer to step S518 and step S519. Details are not described herein again in this embodiment of this application.

Step S616: The electronic device calculates a second exposure time.

Specifically, for a method in which the electronic device calculates the second exposure time of the spectral sensor, refer to step S512. Details are not described herein again in this embodiment of this application.

Step S617: The electronic device determines whether the second exposure time is less than a fourth threshold.

Specifically, if the second exposure time is less than the fourth threshold, step S618 is performed; or if the second exposure time is not less than the fourth threshold, step S619 is performed.

For a related description of determining, by the electronic device, whether the second exposure time is less than the fourth threshold, refer to step S513.

Step S618: The electronic device sets an exposure time of the spectral sensor to the second exposure time.

Step S619: The electronic device sets the exposure time of the spectral sensor to the fourth threshold.

For related descriptions of step S618 and step S619, refer to step S514 to step S515. Details are not described herein again in this embodiment of this application.

According to this embodiment of this application, the electronic device determines, based on the spectral data output through the Clear Channel of the spectral sensor, whether the current photographing environment is a strong light environment or a weak light environment. When the current photographing environment is a weak light environment, the electronic device extends the exposure time of the camera of the electronic device or increases the analog gain of the electronic device according to the related formulas. When the current photographing environment is a strong light environment, the electronic device shortens the exposure time of the camera of the electronic device or reduces the analog gain of the electronic device according to the related formulas. In the foregoing manner, the electronic device dynamically adjusts the exposure time and the analog gain of the camera in different photographing environments (a strong light environment/a weak light environment). This helps the spectral sensor output accurate and comprehensive spectral data in the different photographing environments. In this way, the processor can accurately calculate the CCT of the image light source based on the spectral data, thereby accurately adjusting white balance of the image.

Figure 7A:
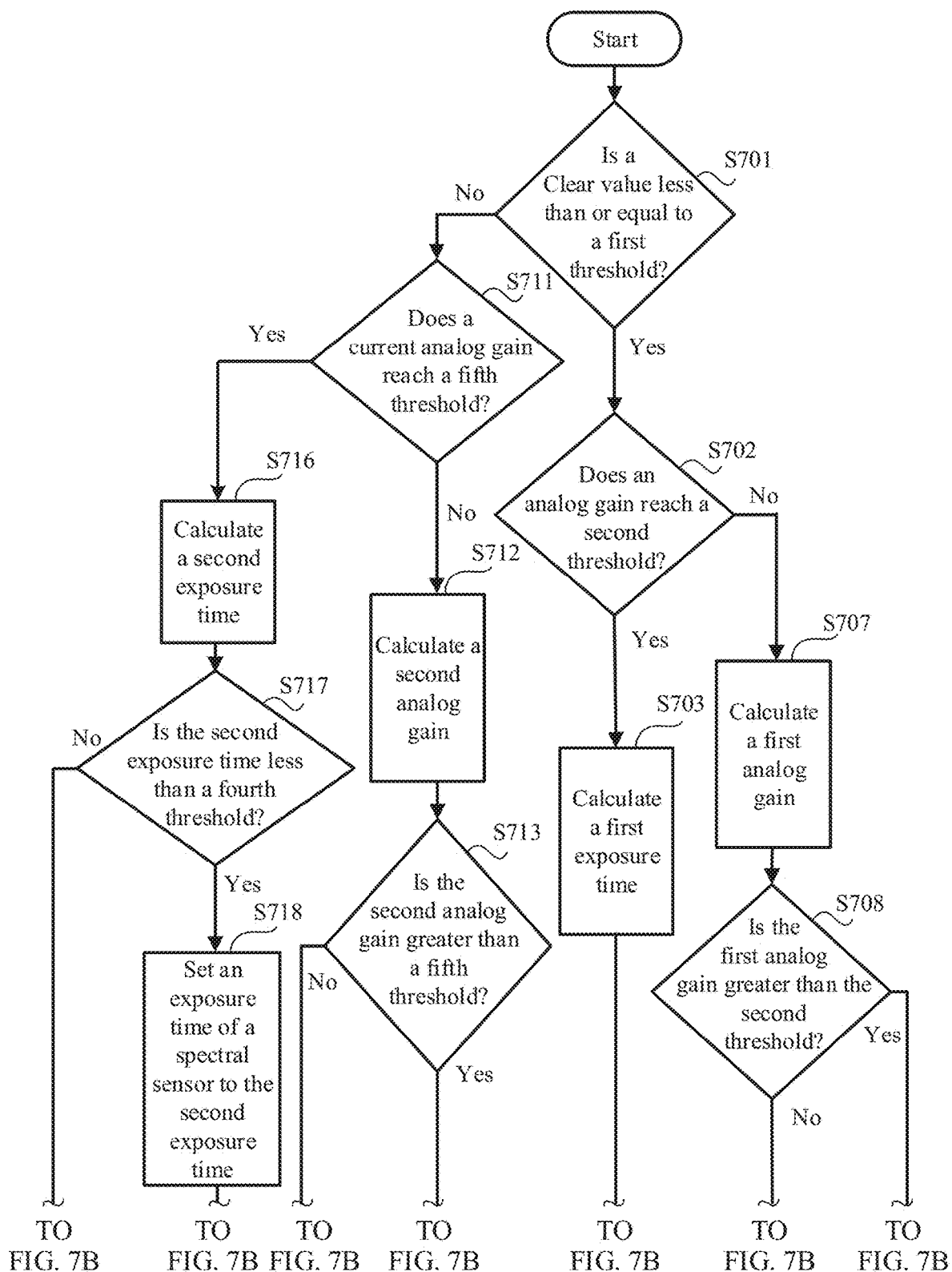
FIG. 7A and FIG. 7B are another schematic flowchart for dynamically adjusting an exposure parameter of a spectral sensor according to an embodiment of this application.
Figure 7B:
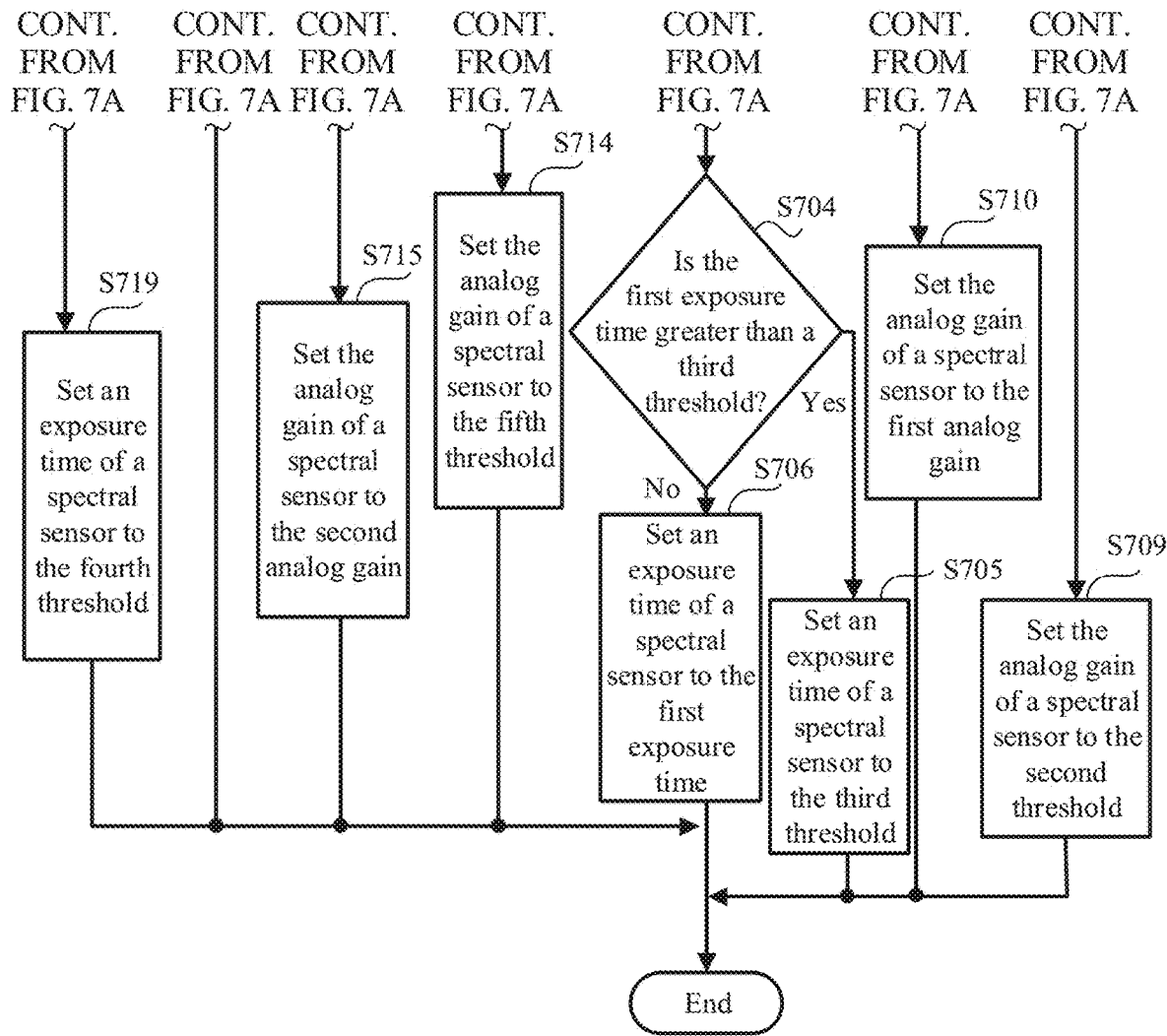

FIG. 7A and FIG. 7B is another schematic flowchart for dynamically adjusting an exposure parameter of a spectral sensor according to an embodiment of this application. A procedure is described below with reference to FIG. 7A and FIG. 7B.

Step S701: An electronic device determines whether a Clear value is less than or equal to a first threshold.

Specifically, for step S701, refer to a related description in step S501. Details are not described herein again in this embodiment of this application. If the Clear value is less than or equal to the first threshold, step S702 is performed; or if the Clear value is not less than or equal to the first threshold, step S711 is performed.

For a related description of determining, by the electronic device, whether the Clear value is less than or equal to the first threshold, refer to step S501. Details are not described herein again in this embodiment of this application.

Step S702 to Step S710 are steps performed by the electronic device when a photographing environment is a weak light environment (the Clear value is less than or equal to the first threshold).

Step S702: The electronic device determines whether a current analog gain of the spectral sensor reaches a second threshold.

Specifically, if the current analog gain of the spectral sensor reaches the second threshold, step S703 is performed; or if the current analog gain of the spectral sensor does not reach the second threshold, step S707 is performed.

For a related description of determining, by the electronic device, whether the analog gain of the optical spectral sensor reaches the second threshold, refer to step S502. Details are not described herein again in this embodiment of this application.

Step S703: The electronic device calculates a first exposure time.

Specifically, for a method in which the electronic device calculates the first exposure time, refer to step S503. Details are not described herein again in this embodiment of this application.

Step S704: The electronic device determines whether the first exposure time is greater than a third threshold.

Specifically, if the first exposure time is greater than the third threshold, step S705 is performed; or if the first exposure time is not greater than the third threshold, step S706 is performed.

Step S705: The electronic device sets an exposure time of the spectral sensor to the third threshold.

Step S706: The electronic device sets an exposure time of the spectral sensor to the first exposure time.

For step S705 and step S706, refer to related descriptions of step S505 and step S506. Details are not described herein again in this embodiment of this application.

Step S707: The electronic device calculates a first analog gain.

Specifically, for a method in which the electronic device calculates the first analog gain, refer to step S507. Details are not described herein again in this embodiment of this application.

Step S708: The electronic device determines whether the first analog gain is greater than the second threshold.

Specifically, if the first analog gain is greater than the second threshold, step S709 is performed; or if the first analog gain is not greater than the second threshold, step S710 is performed.

For a related description of determining, by the electronic device, whether the first analog gain is greater than the second threshold, refer to step S508. Details are not described herein again in this embodiment of this application.

Step S709: The electronic device sets the analog gain of the spectral sensor to the second threshold.

Step S710: The electronic device sets the analog gain of the spectral sensor to the first analog gain.

Specifically, for step S709 and step S710, refer to related descriptions of step S509 and step S510. Details are not described herein again in this embodiment of this application.

Step S711 to Step S719 are steps performed by the electronic device when the photographing environment is a strong light environment (the Clear value is greater than the first threshold).

Step S711: The electronic device determines whether a current analog gain of the spectral sensor reaches a fifth threshold.

Specifically, if the current analog gain of the spectral sensor reaches the fifth threshold, it indicates that the current analog gain of the spectral sensor is greater than the fifth threshold, and step S712 is performed; or the current analog gain of the spectral sensor does not reach the fifth threshold, step S716 is performed.

Step S712: The electronic device calculates a second analog gain.

Specifically, for a method in which the electronic device calculates the second analog gain, refer to step S516. Details are not described herein again in this embodiment of this application.

Step S713: The electronic device determines whether the second analog gain is greater than the fifth threshold.

Specifically, if the second analog gain is greater than the fifth threshold, step S614 is performed; or if the second analog gain is not greater than the fifth threshold, step S615 is performed.

For a related description of determining, by the electronic device, whether the second analog gain is greater than the fifth threshold, refer to step S517. Details are not described herein again in this embodiment of this application.

Step S714: The electronic device sets the analog gain of the spectral sensor to the fifth threshold.

Step S715: The electronic device sets an analog gain of the spectral sensor to the second analog gain.

For related descriptions of step S714 and step S715, refer to step S518 and step S519. Details are not described herein again in this embodiment of this application.

Step S716: The electronic device calculates a second exposure time.

Specifically, for a method in which the electronic device calculates the second exposure time, refer to step S512. Details are not described herein again in this embodiment of this application.

Step S717: The electronic device determines whether the second exposure time is less than a fourth threshold.

Specifically, if the second exposure time is less than the fourth threshold, step S618 is performed, or if the second exposure time is not less than the fourth threshold, step S619 is performed.

For a related description of determining, by the electronic device, whether the second exposure time is less than the fourth threshold, refer to step S513.

Step S718: The electronic device sets an exposure time of the spectral sensor to the second exposure time.

Step S719: The electronic device sets an exposure time of the spectral sensor to the fourth threshold.

For related descriptions of step S718 and step S719, refer to step S514 and step S515. Details are not described herein again in this embodiment of this application.

According to this embodiment of this application, the electronic device determines, based on the spectral data output through the Clear Channel of the spectral sensor, whether the current photographing environment is a strong light environment or a weak light environment. When the current photographing environment is a weak light environment, the electronic device extends the exposure time of the camera of the electronic device or increases the analog gain of the electronic device according to the related formulas. When the current photographing environment is a strong light environment, the electronic device shortens the exposure time of the camera of the electronic device or reduces the analog gain of the electronic device according to the related formulas. In the foregoing manner, the electronic device dynamically adjusts the exposure time and the analog gain of the camera in different photographing environments (a strong light environment/a weak light environment). This helps the spectral sensor output accurate and comprehensive spectral data in the different photographing environments. In this way, the processor can accurately calculate the CCT of the image light source based on the spectral data, thereby accurately adjusting white balance of the image.

Figure 8A:
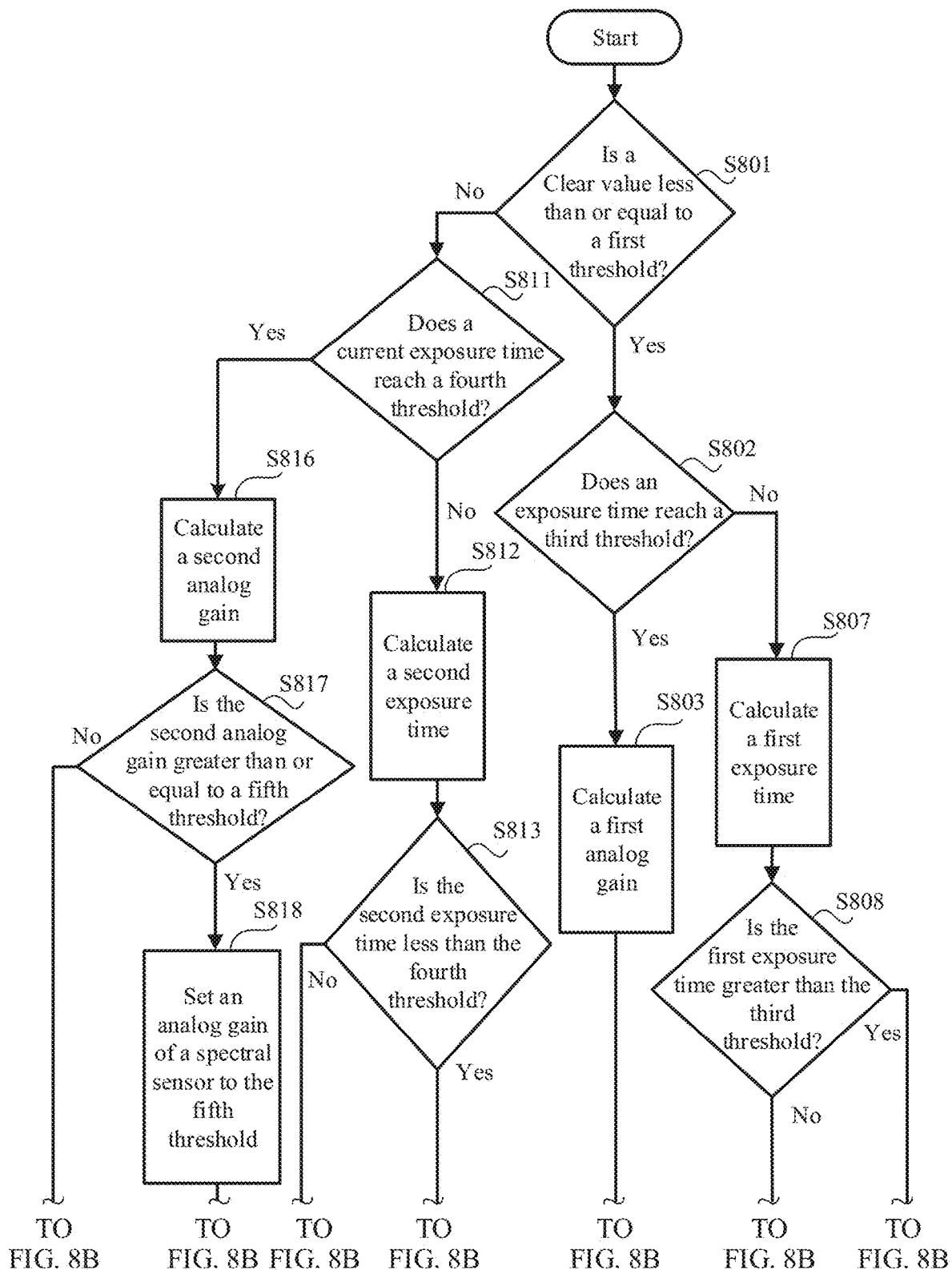
FIG. 8A and FIG. 8B are another schematic flowchart for dynamically adjusting an exposure parameter of a spectral sensor according to an embodiment of this application.
Figure 8B:
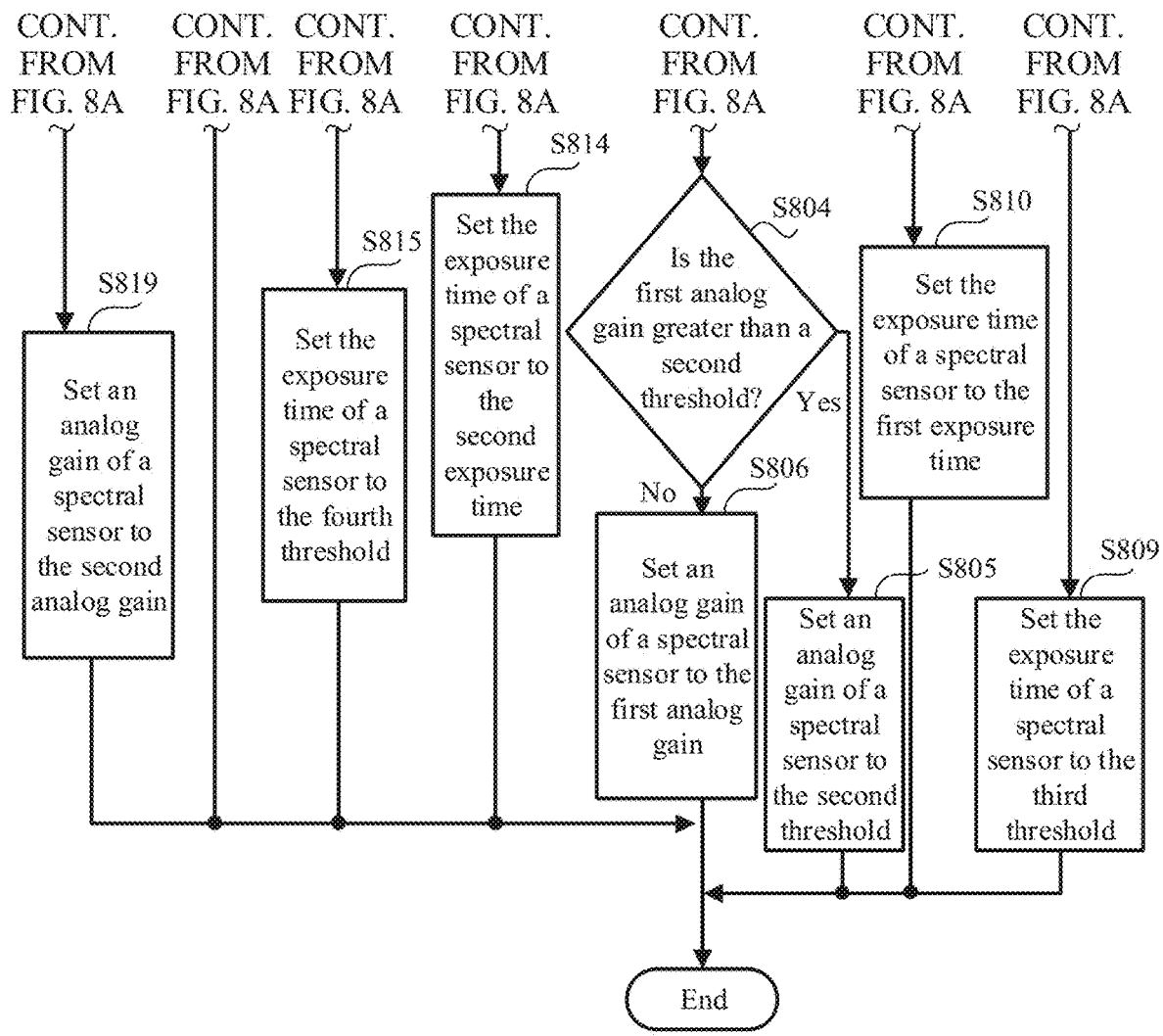

FIG. 8A and FIG. 8B are another schematic flowchart for dynamically adjusting an exposure parameter of a spectral sensor according to an embodiment of this application. A procedure is described below with reference to FIG. 8A and FIG. 8B.

Step S801: An electronic device determines whether a Clear value is less than or equal to a first threshold.

Specifically, for step S801, refer to a related description in step S501. Details are not described herein again in this embodiment of this application. If the Clear value is less than or equal to the first threshold, step S802 is performed; or if the Clear value is not less than or equal to the first threshold, step S811 is performed.

For a related description of determining, by the electronic device, whether the Clear value is less than or equal to the first threshold, refer to step S501. Details are not described herein again in this embodiment of this application.

Step S802 to Step S810 are steps performed by the electronic device when a photographing environment is a weak light environment (the Clear value is less than or equal to the first threshold).

Step S802: The electronic device determines whether a current exposure time of the spectral sensor reaches a third threshold.

Specifically, if the current exposure time of the spectral sensor reaches the third threshold, step S803 is performed; or if the current exposure time of the spectral sensor does not reach the third threshold, step S807 is performed.

Step S803: The electronic device calculates a first analog gain.

Specifically, for a process in which the electronic device calculates the first analog gain, refer to step S807. Details are not described herein again in this embodiment of this application.

Step S804: The electronic device determines whether the first analog gain is greater than a second threshold.

Specifically, if the first analog gain is greater than the second threshold, step S805 is performed; or if the first analog gain is not greater than the second threshold, step S806 is performed.

For a related description of determining, by the electronic device, whether the first analog gain is greater than the second threshold, refer to step S508. Details are not described herein again in this embodiment of this application.

Step S805: The electronic device sets an analog gain of the spectral sensor to the second threshold.

Step S806: The electronic device sets an analog gain of the spectral sensor to the first analog gain.

For related descriptions of step S805 and step S806, refer to step S509 and step S510. Details are not described herein again in this embodiment of this application.

Step S807: The electronic device calculates a first exposure time.

Specifically, for a method in which the electronic device calculates the first exposure time, refer to step S503. Details are not described herein again in this embodiment of this application.

Step S808: The electronic device determines whether the first exposure time is greater than the third threshold.

Specifically, if the first exposure time is greater than the third threshold, step S809 is performed; or if the first exposure time is not greater than the third threshold, step S810 is performed.

For a description of determining, by the electronic device, whether the first exposure time is greater than the third threshold, refer to step S504. Details are not described herein again in this embodiment of this application.

Step S809: The electronic device sets the exposure time of the spectral sensor to the third threshold.

Step S810: The electronic device sets the exposure time of the spectral sensor to the first exposure time.

For related descriptions of step S809 and step S810, refer to step S505 and step S506. Details are not described herein again in this embodiment of this application.

Step S811 to Step S819 are steps performed by the electronic device when the photographing environment is a strong light environment (the Clear value is greater than the first threshold).

Step S811: The electronic device determines whether a current exposure time of the spectral sensor reaches a fourth threshold.

Specifically, if the current exposure time of the spectral sensor reaches the fourth threshold, it indicates that the current exposure time of the spectral sensor is a lower threshold of the exposure time, and step S816 is performed; or if the current exposure time of the spectral sensor does not reach the fourth threshold, it indicates that the current exposure time of the spectral sensor is greater than a lower threshold of the exposure time, and step S812 is performed.

For step S811, refer to a related description in the foregoing step S511. Details are not described herein again in this embodiment of this application.

Step S812: The electronic device calculates a second exposure time.

Specifically, for a method and process in which the electronic device calculates the second exposure time, refer to step S512. Details are not described herein again in this embodiment of this application.

Step S813: The electronic device determines whether the second exposure time is less than the fourth threshold.

Specifically, if the second exposure time is less than the fourth threshold, step S814 is performed; or if the second exposure time is not less than the fourth threshold, step S815 is performed.

Step S814: The electronic device sets the exposure time of the spectral sensor to the second exposure time.

Step S815: The electronic device sets the exposure time of the spectral sensor to the fourth threshold.

Specifically, for step S814 and step S815, refer to related descriptions of step S514 and step S515. Details are not described herein again in this embodiment of this application.

Step S816: The electronic device calculates a second analog gain.

Specifically, for a related method and process in which the electronic device calculates the second analog gain, refer to step S516. Details are not described herein again in this embodiment of this application.

Step S817: The electronic device determines whether the second analog gain is greater than a fifth threshold.

Specifically, if the second analog gain is greater than a fifth threshold, step S818 is performed; or if the second analog gain is not greater than a fifth threshold, step S819 is performed.

For a related description of determining, by the electronic device, whether the second analog gain is greater than the fifth threshold, refer to step S517. Details are not described herein again in this embodiment of this application.

Step S818: The electronic device sets an analog gain of the spectral sensor to the fifth threshold.

Step S819: The electronic device sets an analog gain of the spectral sensor to the second analog gain.

For step S818 and step S819, refer to related descriptions of step S518 and step S519. Details are not described herein again in this embodiment of this application.

According to this embodiment of this application, the electronic device determines, based on the spectral data output through the Clear Channel of the spectral sensor, whether the current photographing environment is a strong light environment or a weak light environment. When the current photographing environment is a weak light environment, the electronic device extends the exposure time of the camera of the electronic device or increases the analog gain of the electronic device according to the related formulas. When the current photographing environment is a strong light environment, the electronic device shortens the exposure time of the camera of the electronic device or reduces the analog gain of the electronic device according to the related formulas. In the foregoing manner, the electronic device dynamically adjusts the exposure time and the analog gain of the camera in different photographing environments (a strong light environment/a weak light environment). This helps the spectral sensor output accurate and comprehensive spectral data in the different photographing environments. In this way, the processor can accurately calculate the CCT of the image light source based on the spectral data, thereby accurately adjusting white balance of the image.

All or some of the foregoing embodiments may be implemented by using software, hardware, firmware, or any combination thereof. When software is used to implement embodiments, all or some embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (such as a coaxial cable, an optical fiber, or a digital subscriber line) manner or a wireless (such as infrared, wire-free, or microwave) manner. The computer-readable storage medium may be any usable medium accessible by a computer, or a data storage device, for example, a server or a data center that integrates one or more usable media. The usable medium may be a magnetic medium (for example, a floppy disk, a hard disk, or magnetic tape), an optical medium (for example, a DVD), a semiconductor medium (for example, a solid state disk Solid State Disk), or the like.

A person of ordinary skill in the art may understand that all or some of the procedures in the methods in the foregoing embodiments are implemented, and the procedures may be implemented by a computer program instructing related hardware. The program may be stored in a computer-readable storage medium. When the program is executed, the procedures in the methods in the foregoing embodiments may be included. The foregoing storage medium includes any medium that can store program code, such as a ROM, a random storage memory RAM, a magnetic disk, or an optical disc.

In conclusion, the foregoing descriptions are only embodiments of the technical solutions of this application, and are not intended to limit the protection scope of this application. Any modifications, equivalent replacements, improvements, or the like made based on the disclosure of the present invention shall fall within the protection scope of the present invention.

What is claimed is:

1. A method for photographing an image, comprising:
receiving a first user operation on a camera application of an electronic device;
starting the camera application and presenting a photographing interface in response to the first user operation, wherein the photographing interface includes a photographing control and an image preview area;
receiving a second user operation on the photographing control; and
photographing a picture and displaying a photographing processing interface in the image preview area in response to the second user operation, wherein, in a process of photographing the picture, the method further comprises:
receiving a Clear value of a spectral sensor of the electronic device, wherein the spectral sensor includes a plurality of visible optical channels and a Clear channel, and wherein a wavelength range of any one visible optical channel in the plurality of visible optical channels is located within a wavelength range of the Clear channel;
extending an exposure time of the spectral sensor based on the Clear value being less than or equal to a first threshold and an analog gain of the spectral sensor being greater than or equal to a second threshold, wherein the second threshold is an upper threshold of the analog gain of the spectral sensor;
increasing the analog gain of the spectral sensor based on the Clear value being less than or equal to the first threshold and the analog gain of the spectral sensor being less than the second threshold;
reducing the analog gain of the spectral sensor based on the Clear value being greater than the first threshold and an exposure time of the spectral sensor being greater than or equal to a third threshold, wherein the third threshold is a lower threshold over the exposure time of the spectral sensor;
shortening the exposure time of the spectral sensor based on the Clear value being greater than the first threshold and the exposure time of the spectral sensor being less than the third threshold;
acquiring a spectral data of a photographing environment output by the spectral sensor based on adjusted exposure parameters;
converting a light signal obtained through a lens into an electrical signal through a photosensitive element of the electronic device;
processing the electrical signal to obtain an initial image; and
performing white balance processing on the initial image based on the spectral data of the photographing environment to obtain a processed image.

2. The method of claim 1, wherein performing white balance processing on the initial image to obtain the processed image comprises:
calculating a correlated color temperature (CCT) of the photographing environment based on the spectral data of the photographing environment; and adjusting red, green, blue (RGB) values of the initial image based on RGB gain values of the initial image to obtain a processed image, wherein the RGB gain values of the initial image are based on the CCT of the photographing environment.

3. The method of claim 1, further comprising displaying a prompt information on the photographing processing interface to prompt the user to hold the electronic device steadily.

4. The method of claim 1, wherein extending the exposure time of the spectral sensor comprises:
   calculating a first exposure time of the spectral sensor according to a formula $Exop\_1'=Expo*X$, wherein Expo is a current exposure time of the spectral sensor, $Exop\_1'$ is the first exposure time, and X is a first gain coefficient greater than 1;
   setting the exposure time of the spectral sensor to a fourth threshold based on the first exposure time being greater than the fourth threshold, wherein the fourth threshold is an upper threshold of the exposure time of the spectral sensor; and
   setting the exposure time of the spectral sensor to the first exposure time based on the first exposure time being less than or equal to the fourth threshold.

5. The method of claim 1, wherein increasing the analog gain of the spectral sensor comprises:
   calculating a first analog gain of the spectral sensor according to a formula $Gain\_1'=Gain*Y$, wherein Gain is a current analog gain of the spectral sensor, $Gain\_1'$ is the first analog gain, and Y is a second gain coefficient greater than 1;
   setting the analog gain of the spectral sensor to the second threshold based on the first analog gain being greater than the second threshold; and
   setting the analog gain of the spectral sensor to the first analog gain based on the first analog gain being less than or equal to the second threshold.

6. The method of claim 1, wherein reducing the analog gain of the spectral sensor comprises:
   calculating a second analog gain of the spectral sensor according to a formula $Gain\_2'=Gain*Y'$, wherein Gain is a current analog gain of the spectral sensor, $Gain\_2'$ is the second analog gain, and Y' is a fourth gain coefficient less than 1;
   setting the analog gain of the spectral sensor to a fifth threshold based on the second analog gain being less than the fifth threshold, wherein the fifth threshold is a lower threshold of the analog gain of the spectral sensor; and
   setting the analog gain of the spectral sensor to the second analog gain based on the second analog gain being greater than or equal to the fifth threshold.

7. The method of claim 1, wherein shortening the exposure time of the spectral sensor comprises:
   calculating a second exposure time of the spectral sensor according to a formula $Exop\_2'=Expo*X'$, wherein Expo is a current exposure time of the spectral sensor, X' is a third gain coefficient less than 1, and $Exop\_2'$ is the second exposure time;
   setting the exposure time of the spectral sensor to the third threshold based on the second exposure time being less than the third threshold; and
   setting the exposure time of the spectral sensor to the second exposure time based on the second exposure time being greater than or equal to the third threshold.

8. An electronic device, comprising:
   one or more processors;
   a spectral sensor coupled to the one or more processors, wherein the spectral sensor includes a plurality of visible optical channels and a Clear channel, and wherein a wavelength range of any one visible optical channel in the plurality of visible optical channels is located within a wavelength range of the Clear channel;
   a communication apparatus coupled to the one or more processors;
   a display apparatus coupled to the one or more processors, wherein the display apparatus is configured to display an image; and
   one or more memories coupled to the one or more processors and storing instructions that, when executed by the one or more processors, cause the electronic device to be configured to:
      receive a first user operation on a camera application;
      start the camera application and present a photographing interface in response to the first user operation, wherein the photographing interface includes a photographing control and an image preview area;
      receive a second user operation on the photographing control; and photograph a picture and display a photographing processing interface in the image preview area in response to the second user operation, wherein, in a process of photographing the picture, the electronic device is further configured to:
      receive a Clear value of the spectral sensor;
      extend an exposure time of the spectral sensor based on the Clear value being less than or equal to a first threshold and an analog gain of the spectral sensor being greater than or equal to a second threshold, wherein the second threshold is an upper threshold of the analog gain of the spectral sensor;
      increase the analog gain of the spectral sensor based on the Clear value being less than or equal to the first threshold and the analog gain of the spectral sensor being less than the second threshold;
      reduce the analog gain of the spectral sensor based on the Clear value being greater than the first threshold and an exposure time of the spectral sensor being greater than or equal to a third threshold, wherein the third threshold is a lower threshold over the exposure time of the spectral sensor;
      shorten the exposure time of the spectral sensor based on the Clear value being greater than the first threshold and the exposure time of the spectral sensor being less than the third threshold;
      acquire a spectral data of a photographing environment output by the spectral sensor based on adjusted exposure parameters;
      convert a light signal obtained through a lens into an electrical signal through a photosensitive element of the electronic device;
      process the electrical signal to obtain an initial image; and
      perform white balance processing on the initial image based on the spectral data of the photographing environment to obtain a processed image.

9. The electronic device of claim 8, wherein performing white balance processing on the initial image to obtain the processed image comprises:
   calculating a correlated color temperature (CCT) of the photographing environment based on the spectral data of the photographing environment; and adjusting red, green, blue (RGB) values of the initial image based on RGB gain values of the initial image to obtain a processed image, wherein the RGB gain values of the initial image are based on the CCT of the photographing environment.

10. The electronic device of claim 8, wherein the display apparatus is further configured to display a prompt information on the photographing processing interface to prompt the user to hold the electronic device steadily.

11. The electronic device of claim 8, wherein extending the exposure time of the spectral sensor comprises:
calculating a first exposure time of the spectral sensor according to a formula $Exop\_1'=Expo*X$, wherein Expo is a current exposure time of the spectral sensor, $Exop\_1'$ is the first exposure time, and X is a first gain coefficient greater than 1;
setting the exposure time of the spectral sensor to a fourth threshold based on the first exposure time being greater than the fourth threshold, wherein the fourth threshold is an upper threshold of the exposure time of the spectral sensor; and
setting the exposure time of the spectral sensor to the first exposure time based on the first exposure time being less than or equal to the fourth threshold.

12. The electronic device of claim 8, wherein increasing the analog gain of the spectral sensor comprises:
calculating a first analog gain of the spectral sensor according to a formula $Gain\_1'=Gain*Y$, wherein Gain is a current analog gain of the spectral sensor, $Gain\_1'$ is the first analog gain, and Y is a second gain coefficient greater than 1;
setting the analog gain of the spectral sensor to the second threshold based on the first analog gain being greater than the second threshold; and
setting the analog gain of the spectral sensor to the first analog gain based on the first analog gain being less than or equal to the second threshold.

13. The electronic device of claim 8, wherein reducing the analog gain of the spectral sensor comprises:
calculating a second analog gain of the spectral sensor according to a formula $Gain\_2'=Gain*Y'$, wherein Gain is a current analog gain of the spectral sensor, $Gain\_2'$ is the second analog gain, and Y' is a fourth gain coefficient less than 1;
setting the analog gain of the spectral sensor to a fifth threshold based on the second analog gain being less than the fifth threshold, wherein the fifth threshold is a lower threshold of the analog gain of the spectral sensor; and
setting the analog gain of the spectral sensor to the second analog gain based on the second analog gain being greater than or equal to the fifth threshold.

14. The electronic device of claim 8, wherein shortening the exposure time of the spectral sensor comprises:
calculating a second exposure time of the spectral sensor according to a formula $Exop\_2'=Expo*X'$, wherein Expo is a current exposure time of the spectral sensor, X' is a third gain coefficient less than 1, and $Exop\_2'$ is the second exposure time;
setting the exposure time of the spectral sensor to the third threshold based on the second exposure time being less than the third threshold; and
setting the exposure time of the spectral sensor to the second exposure time based on the second exposure time being greater than or equal to the third threshold.

15. A non-transitory computer-readable storage medium storing instructions that, when executed by a processor of an electronic device, cause the electronic device to be configured to:
receive a first user operation on a camera application;
start the camera application and present a photographing interface in response to the first user operation, wherein the photographing interface includes a photographing control and an image preview area;
receive a second user operation on the photographing control; and
photograph a picture and display a photographing processing interface in the image preview area in response to the second user operation, wherein, in a process of photographing the picture, the electronic device is further configured to:
receive a Clear value of a spectral sensor of the electronic device, wherein the spectral sensor includes a plurality of visible optical channels and a Clear channel, and wherein a wavelength range of any one visible optical channel in the plurality of visible optical channels is located within a wavelength range of the Clear channel;
extend an exposure time of the spectral sensor based on the Clear value being less than or equal to a first threshold and an analog gain of the spectral sensor being greater than or equal to a second threshold, wherein the second threshold is an upper threshold of the analog gain of the spectral sensor;
increase the analog gain of the spectral sensor based on the Clear value being less than or equal to the first threshold and the analog gain of the spectral sensor being less than the second threshold;
reduce the analog gain of the spectral sensor based on the Clear value being greater than the first threshold and an exposure time of the spectral sensor being greater than or equal to a third threshold, wherein the third threshold is a lower threshold over the exposure time of the spectral sensor;
shorten the exposure time of the spectral sensor based on the Clear value being greater than the first threshold and the exposure time of the spectral sensor being less than the third threshold;
acquire a spectral data of a photographing environment output by the spectral sensor based on adjusted exposure parameters;
convert a light signal obtained through a lens into an electrical signal through a photosensitive element of the electronic device;
process the electrical signal to obtain an initial image; and
perform white balance processing on the initial image based on the spectral data of the photographing environment to obtain a processed image.

16. The non-transitory computer-readable storage medium of claim 15, wherein performing white balance processing on the initial image to obtain the processed image comprises:
calculating a correlated color temperature (CCT) of the photographing environment based on the spectral data of the photographing environment; and
adjusting red, green, blue (RGB) values of the initial image based on RGB gain values of the initial image to obtain a processed image, wherein the RGB gain values of the initial image are based on the CCT of the photographing environment.

17. The non-transitory computer-readable storage medium of claim 15, wherein extending the exposure time of the spectral sensor comprises:
calculating a first exposure time of the spectral sensor according to a formula $Exop\_1'=Expo*X$, wherein Expo is a current exposure time of the spectral sensor, $Exop\_1'$ is the first exposure time, and X is a first gain coefficient greater than 1;
setting the exposure time of the spectral sensor to a fourth threshold based on the first exposure time being greater than the fourth threshold, wherein the fourth threshold is an upper threshold of the exposure time of the spectral sensor; and
setting the exposure time of the spectral sensor to the first exposure time based on the first exposure time being less than or equal to the fourth threshold.

18. The non-transitory computer-readable storage medium of claim 15, wherein increasing the analog gain of the spectral sensor comprises:
calculating a first analog gain of the spectral sensor according to a formula $Gain\_1'=Gain*Y$, wherein Gain is a current analog gain of the spectral sensor, $Gain\_1'$ is the first analog gain, and Y is a second gain coefficient greater than 1;
setting the analog gain of the spectral sensor to the second threshold based on the first analog gain being greater than the second threshold; and
setting the analog gain of the spectral sensor to the first analog gain based on the first analog gain being less than or equal to the second threshold.

19. The non-transitory computer-readable storage medium of claim 15, wherein reducing the analog gain of the spectral sensor comprises:
calculating a second analog gain of the spectral sensor according to a formula $Gain\_2'=Gain*Y'$, wherein Gain is a current analog gain of the spectral sensor, $Gain\_2'$ is the second analog gain, and $Y'$ is a fourth gain coefficient less than 1;
setting the analog gain of the spectral sensor to a fifth threshold based on the second analog gain being less than the fifth threshold, wherein the fifth threshold is a lower threshold of the analog gain of the spectral sensor; and
setting the analog gain of the spectral sensor to the second analog gain based on the second analog gain being greater than or equal to the fifth threshold.

20. The non-transitory computer-readable storage medium of claim 15, wherein shortening the exposure time of the spectral sensor comprises:
calculating a second exposure time of the spectral sensor according to a formula $Exop\_2'=Expo*X'$, wherein Expo is a current exposure time of the spectral sensor, $X'$ is a third gain coefficient less than 1, and $Exop\_2'$ is the second exposure time;
setting the exposure time of the spectral sensor to the third threshold based on the second exposure time being less than the third threshold; and
setting the exposure time of the spectral sensor to the second exposure time based on the second exposure time being greater than or equal to the third threshold.

* * * * *